US012598067B2

(12) United States Patent
You et al.

(10) Patent No.: US 12,598,067 B2
(45) Date of Patent: Apr. 7, 2026

(54) METHOD, DEVICE, AND SYSTEM FOR UPDATING ANCHOR KEY IN A COMMUNICATION NETWORK FOR ENCRYPTED COMMUNICATION WITH SERVICE APPLICATIONS

(71) Applicant: ZTE Corporation, Shenzhen (CN)

(72) Inventors: Shilin You, Shenzhen (CN); Jiyan Cai, Shenzhen (CN); Yuze Liu, Shenzhen (CN); Jin Peng, Shenzhen (CN); Wantao Yu, Shenzhen (CN); Zhaoji Lin, Shenzhen (CN); Yuxin Mao, Shenzhen (CN); Jianhua Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 413 days.

(21) Appl. No.: 17/858,694

(22) Filed: Jul. 6, 2022

(65) Prior Publication Data

US 2022/0345307 A1      Oct. 27, 2022

Related U.S. Application Data

(63) Continuation of application No. PCT/CN2020/072448, filed on Jan. 16, 2020.

(51) Int. Cl.
*H04L 9/08*          (2006.01)
*H04L 9/40*          (2022.01)
*H04W 12/041*      (2021.01)

(52) U.S. Cl.
CPC ............ *H04L 9/0891* (2013.01); *H04L 9/083* (2013.01); *H04L 63/08* (2013.01); *H04W 12/041* (2021.01); *H04L 2209/80* (2013.01)

(58) Field of Classification Search
CPC ...... H04W 12/04; H04W 12/041; H04L 9/08; H04L 9/0891; H04L 63/08; H04L 2209/80
See application file for complete search history.

(56) References Cited

U.S. PATENT DOCUMENTS 9,918,225 B2      3/2018 Lee et al.
10,708,772 B2     7/2020 Wager et al.
(Continued)

FOREIGN PATENT DOCUMENTS

CN      101267309 A      9/2008
CN      101848425 A      9/2010
(Continued)

OTHER PUBLICATIONS

International Search Report mailed Oct. 13, 2020 for International Application No. PCT/CN2020/072448.
(Continued)

*Primary Examiner* — Jeremy S Duffield
(74) *Attorney, Agent, or Firm* — Crowell & Moring LLP

(57) ABSTRACT

This disclosure generally relates to encrypted communication between terminal devices and service applications via a communication network. Such encrypted communication may be based on various hierarchical levels of encryption keys that are generated and managed by the communication network. Such encrypted communication and key management may be provided by the communication network to the terminal devices as a service that can be subscribed to. The various levels of encryption keys may be managed to improve flexibility of the communication network and to reduce potential security breaches.

20 Claims, 14 Drawing Sheets

(56) References Cited

U.S. PATENT DOCUMENTS

| | | | |
|---|---|---|---|
| 10,841,084 B2 | 11/2020 | Lee et al. | |
| 10,841,302 B2 | 11/2020 | Hahn et al. | |
| 11,431,561 B2 | 8/2022 | Smith et al. | |
| 11,452,001 B2 | 9/2022 | Lia et al. | |
| 11,456,867 B2 | 9/2022 | Schmatz | |
| 11,496,292 B2 | 11/2022 | Fischer et al. | |
| 11,876,895 B2 | 1/2024 | Fischer et al. | |
| 2002/0062451 A1 | 5/2002 | Scheidt et al. | |
| 2007/0140480 A1 | 6/2007 | Yao | |
| 2010/0268943 A1 | 10/2010 | Roy-Chowdhury et al. | |
| 2012/0135701 A1* | 5/2012 | Zhu | H04W 68/00 |
| | | | 455/404.1 |
| 2013/0054967 A1 | 2/2013 | Davoust et al. | |
| 2015/0199213 A1* | 7/2015 | Desai | G06F 9/468 |
| | | | 718/102 |
| 2016/0094521 A1* | 3/2016 | Rao | H04L 63/0428 |
| | | | 713/171 |
| 2016/0119311 A1* | 4/2016 | Maria | H04L 63/062 |
| | | | 726/14 |
| 2016/0226828 A1* | 8/2016 | Bone | H04L 63/08 |
| 2017/0054691 A1 | 2/2017 | Graubner et al. | |
| 2017/0063827 A1 | 3/2017 | Ricardo | |
| 2017/0195877 A1* | 7/2017 | Lehtovirta | H04W 8/005 |
| 2018/0227302 A1 | 8/2018 | Lee et al. | |
| 2018/0343249 A1 | 11/2018 | Hahn et al. | |
| 2018/0365411 A1 | 12/2018 | Falk et al. | |
| 2018/0367991 A1 | 12/2018 | Wager et al. | |
| 2019/0037395 A1 | 1/2019 | Lehtovirta et al. | |
| 2019/0098502 A1 | 3/2019 | Torvinen et al. | |
| 2019/0253889 A1 | 8/2019 | Wu et al. | |
| 2019/0261178 A1 | 8/2019 | Rajadurai et al. | |
| 2019/0349426 A1 | 11/2019 | Smith et al. | |
| 2019/0387401 A1 | 12/2019 | Lia et al. | |
| 2020/0014535 A1 | 1/2020 | Baskaran et al. | |
| 2020/0280896 A1* | 9/2020 | Ying | H04W 76/19 |
| 2020/0344048 A1 | 10/2020 | Fischer et al. | |
| 2020/0344604 A1* | 10/2020 | He | H04L 9/30 |
| 2020/0396792 A1* | 12/2020 | Tiwari | H04W 4/90 |
| 2021/0126781 A1 | 4/2021 | Schmatz | |
| 2022/0060896 A1* | 2/2022 | Wu | H04L 9/0844 |
| 2022/0095104 A1* | 3/2022 | Ben Henda | H04W 12/0433 |
| 2022/0174063 A1* | 6/2022 | Wu | H04L 9/0844 |
| 2022/0191008 A1* | 6/2022 | Nair | H04W 12/043 |
| 2022/0295271 A9 | 9/2022 | Wu | |
| 2022/0417010 A1* | 12/2022 | De Kievit | H04W 12/04 |
| 2023/0070124 A1 | 3/2023 | Fischer et al. | |
| 2023/0110131 A1 | 4/2023 | Smith et al. | |

FOREIGN PATENT DOCUMENTS

| | | | | | |
|---|---|---|---|---|---|
| CN | 104917618 A | | 9/2015 | | |
| CN | 106922216 A | | 7/2017 | | |
| CN | 108809635 A | | 11/2018 | | |
| CN | 108810890 A | | 11/2018 | | |
| CN | 109194473 A | | 1/2019 | | |
| CN | 110635905 A | | 12/2019 | | |
| CN | 112087753 A | * | 12/2020 | | H04W 12/40 |
| IN | 201941024005 | * | 6/2019 | | |
| JP | 4654498 B2 | | 3/2011 | | |
| JP | WO 2018-116231 A | | 7/2018 | | |
| KR | 10-2014-0119497 A | | 10/2014 | | |
| KR | 2018-01-06998 A | | 10/2018 | | |
| KR | 10-2020-0003108 A | | 1/2020 | | |
| TW | 200423675 A | | 11/2004 | | |
| WO | WO 2012/128478 A2 | | 9/2012 | | |
| WO | WO 2012/129503 A1 | | 9/2012 | | |
| WO | WO 2015/069028 A1 | | 5/2015 | | |
| WO | WO 2017/129288 A1 | | 8/2017 | | |
| WO | WO 2018/124857 A1 | | 7/2018 | | |
| WO | WO 2018/144200 A1 | | 8/2018 | | |
| WO | WO 2018/146180 A1 | | 8/2018 | | |
| WO | WO 2019/020193 A1 | | 1/2019 | | |
| WO | WO 2019/020440 A1 | | 1/2019 | | |
| WO | WO 2019/213946 A1 | | 11/2019 | | |
| WO | WO 2020/221019 A1 | | 11/2020 | | |
| WO | WO 2021/115614 A1 | | 6/2021 | | |

OTHER PUBLICATIONS

Written Opinion mailed Oct. 13, 2020 for International Application No. PCT/CN2020/072448.

Official Decision of Grant issued Jul. 3, 2023 for Russian Patent Application No. 2022122039, including English translation (20 pages).

Extended European Search Report dated Nov. 28, 2022 for European Application No. 20888615.0.

First Office Action dated Dec. 19, 2022 for Taiwanese Application No. 110101492.

3rd Generation Partnership Project; Technical Specification Group Services and Systems Aspects; Study on authentication and key management for applications based on 3GPP credential in 5G (Release 16), 3GPP Standard; Technical Report; 3GPP TR 33.835, 3rd Generation Partnership Project (3GPP), Mobile Competence Centre ; 650, Route Des Lucioles ; F-06921 Sophia-Antipolis Cedex ; France, vol. SA WG3, No. V2.0.0 Dec. 4, 2019 (Dec. 4, 2019), pp. 1-83, XP051840699.

3rd Generation Partnership Project; Technical Specification Group Services and System Aspects; Authentication and key management for applications; based on 3GPP credential in 5G AKMA (Release 16), 3GPP Standard; Technical Specification; 3GPP TS 33.535, 3rd Standard; Technical Specification; 3GPP TS 33.535, 3rd Generation Partnership Project (3GPP), Mobile Competence Centre ; 650, Route Des Lucioles ; F-06921 Sophia-Antipolis Cedex ; France, No. VO.2.0 Jan. 2, 2020 (Jan. 2, 2020), pp. 1-11, XP051841097.

Author Unknown, "Security architecture and procedures for 5G System", Technical Specification, ETSI TS 133 501 V15.2.0 Published Oct. 2018. (Year: 2018).

Canadian Office Action, dated Jun. 3, 2024, pp. 1-6, issued in Canadian Patent Application No. 3,159,134, Canadian Intellectual Property Office, Gatineau, Quebec.

China Mobile, Add abbreviations and editorial changes to TR 33.835, Nov. 18-22, 2019, pp. 1-12, 3GPP TSG SA3 Meeting #97 S3-194210, Reno, US.

China Mobile, Vodafone, Key derivation function in TR 33.841, Sep. 24-28, 2018, pp. 1-4, 3GPP TSG SA WG3 (Security) Meeting #92Adhoc S3-183013, Harbin, China.

European Office Action, Dec. 12, 2024, pp. 1-5, issued European Application No. 20 887 115.2, European Patent Office, Munich, Germany.

European Office Action, Sep. 19, 2024, pp. 1-2, issued in Application No. 19 954 008.9.

Examination Report dispatched Oct. 11, 2022 for Indian Application No. 202217031638.

Extended European Search Report dated Dec. 22, 2022 for European Application No. 20887214.3.

First Communication issued by the European Patent Office mailed on Jul. 9, 2024, in European Patent Application No. 20887115.2, European Patent Office, Munich, Germany.

Huawei et al.; "Solution for Key freshness in AKMA"; 3GPP Draft; S3-190169—Solution for Key Freshness in AKMA, 3rd Generation Partnership Project (3GPP), Mobile Competence Centre; Sophia-Antipolis, France; vol. SA WG3, no. Kochi; XP051611437; Jan. 21, 2019, 2 pages.

Huawei, Hisilicon, Delete the EN of solution 5, May 6-10, 2019, pp. 1-4, 3GPP TSG SA WG3 (Security) Meeting #95 S3-191286, Reno, US.

Indian Examination Report dated Jan. 20, 2023 for Indian Application No. 202217037063.

Indian Office Action, Feb. 5, 2025, pp. 1-3, issued in Application No. 202217037063, Intellectual Property, Mumbai, India.

International Search Report and Written Opinion mailed Oct. 12, 2020 for International Application No. PCT/CN2020/072444.

International Search Report and Written Opinion mailed Oct. 13, 2020 for International Application No. PCT/CN2020/072446.

(56)          References Cited

OTHER PUBLICATIONS

Japanese Office Action with English translation, dated Sep. 8, 2023, pp. 1-7, issued in Japanese Patent Application No. 2022-542392.
Korean Office Action with English summary, Nov. 16, 2024, pp. 1-9, issued in Application No. 10-2022-7024684.
Korean Office Action with English translation, Aug. 20, 2024, pp. 1-14, issued in Patent Application No. 069730164, Seoul, Korea.
Mohsin Khan et al: "Privacy Preserving AKMA in 5G", Security Standardisation Research Workshop, ACM, 2 Penn Plaza, Suite 701 New York NY 1 0121-0701 USA, Nov. 11, 2019 (Nov. 11, 2019), pp. 45-56, XP058444062, DOI: 10.1145/3338500.3360337 ISBN: 978-1-4503-6832-2.
Nokia, Nokia Shanghai Bell, China Mobile, Implicit bootstrapping using NEF as the AKMA Anchor Function, Jun. 24-28, 2019, pp. 1-6, 3GPP TSG-SA WG3 Meeting #95 Bis S3-192220, Sapporo, Japan.
Supplementary European Search Report, Sep. 5, 2023, pp. 1-9, issued in European Patent Application No. 20887115.2, European Patent Office, Munich, Germany.
US Office Action, Aug. 27, 2024, pp. 1-18, issued in U.S. Appl. No. 17/858,271, USPTO, Alexandria, Virginia.
US Office Action, Mar. 12, 2024, pp. 1-19, issued in U.S. Appl. No. 17/857,389, USPTO, Alexandria, Virginia.
US Office Action, Oct. 15, 2024, pp. 1-20, issued in U.S. Appl. No. 17/857,389, USPTO, Alexandria, Virginia.
Office Action issued in Chinese Patent Application No. 201980098562.5 dated Feb. 11, 2025, 13 pages.
Office Action issued in Chinese Patent Application No. 202080092552.3 dated Feb. 12, 2025, 6 pages.
MediaTek "Enhancements to HARQ for NR-U operation" 3GPP TSG RAN WG1 #97, May 13, 2019, R1-1906545, 11 pages.
Huawei et al. "HARQ enhancements in NR unlicensed" 3GPP TSG RAN WG1 Meeting #97, R1-1906046, 14 pages.
First Office Action dated Feb. 13, 2025 for Chinese Patent Application No. 202080085232.5, with English translation.
"3GPP TR 33.835, V 16.0.0"; 3GPP Organizational Partners, 3rd Generation Partnership Project; Technical Specification Group Services and System Aspects; Study on authentication and key management for applications based on 3GPP credential in 5G (Release 16); Dec. 10, 2019; 88 pages.
3rd Generation Partnership Project; Technical Specification Group Services and System Aspects; Security architecture and procedures for 5G system (Release 16); 3GPP TS 33.501, V16.1.0; Dec. 2019; 202 pages.
Extended European Search Report completed Oct. 15, 2025 and Search Opinion for European Patent Application No. EP 25 18 8493.8; 8 pages.

* cited by examiner

METHOD, DEVICE, AND SYSTEM FOR UPDATING ANCHOR KEY IN A COMMUNICATION NETWORK FOR ENCRYPTED COMMUNICATION WITH SERVICE APPLICATIONS

CROSS REFERENCE

This application is a continuation of and claims priority to International Patent Application No. PCT/CN2020/072448, filed Jan. 16, 2020, which is herein incorporated by reference in its entirety.

TECHNICAL FIELD

This disclosure is directed to anchor key and application key generation and management for encrypted communication between terminal devices and service applications in communication networks.

BACKGROUND

In a communication network, a communication session and data paths may be established to support transmission of data flows between a terminal device and a service application. The transmission of such data flows may be protected by encryption/decryption keys. The generation and validity management of various levels of encryption/decryption keys may be provided by collaborative efforts of various network functions or network nodes in the communication network during registration procedures to authenticate the terminal device to the communication network and during active communication sessions between the terminal device and the service application.

SUMMARY

This disclosure relates to anchor key and application key generation and management for encrypted communication between terminal devices and service applications in communication networks.

In some implementations, a method for key regeneration in a terminal device for encrypted communication between the terminal device and a service application in a communication network is disclosed. The method may include detecting that a first key for enabling encrypted communication with the service application previously generated from a first registration authentication of the terminal device with the communication network has become invalid; transmitting a request for a second registration authentication to the communication network; generating a second key for enabling encrypted communication with the service application when the second registration authentication is successful; replacing the first key with the second key; and exchanging data with the service application based on the second key. In some other implementations, for key regeneration for encrypted communication between a terminal device and a service application in a communication network is disclosed. The method may be performed by an application key management network node and may include receiving a first request for an anchor key from the service application after the service application receives a communication request from the terminal device; determining that the requested anchor key is invalid; and transmitting to the service application a response to the first request for the anchor key indicating that the requested anchor key is invalid, causing the service application to transmit a second response to the terminal device indicating that the requested anchor key is invalid and causing the terminal device to initiated a request for a registration authentication procedure with the communication network to obtain a replacement to the anchor key.

In some other implementations, a network device is disclosed. The network device main include one or more processors and one or more memories, wherein the one or more processors are configured to read computer code from the one or more memories to implement any one of the methods above.

In yet some other implementations, a computer program product is disclosed. The computer program product may include a non-transitory computer-readable program medium with computer code stored thereupon, the computer code, when executed by one or more processors, causing the one or more processors to implement any one of the methods above.

The above embodiments and other aspects and alternatives of their implementations are explained in greater detail in the drawings, the descriptions, and the claims below.

DETAILED DESCRIPTION

Figure 1:
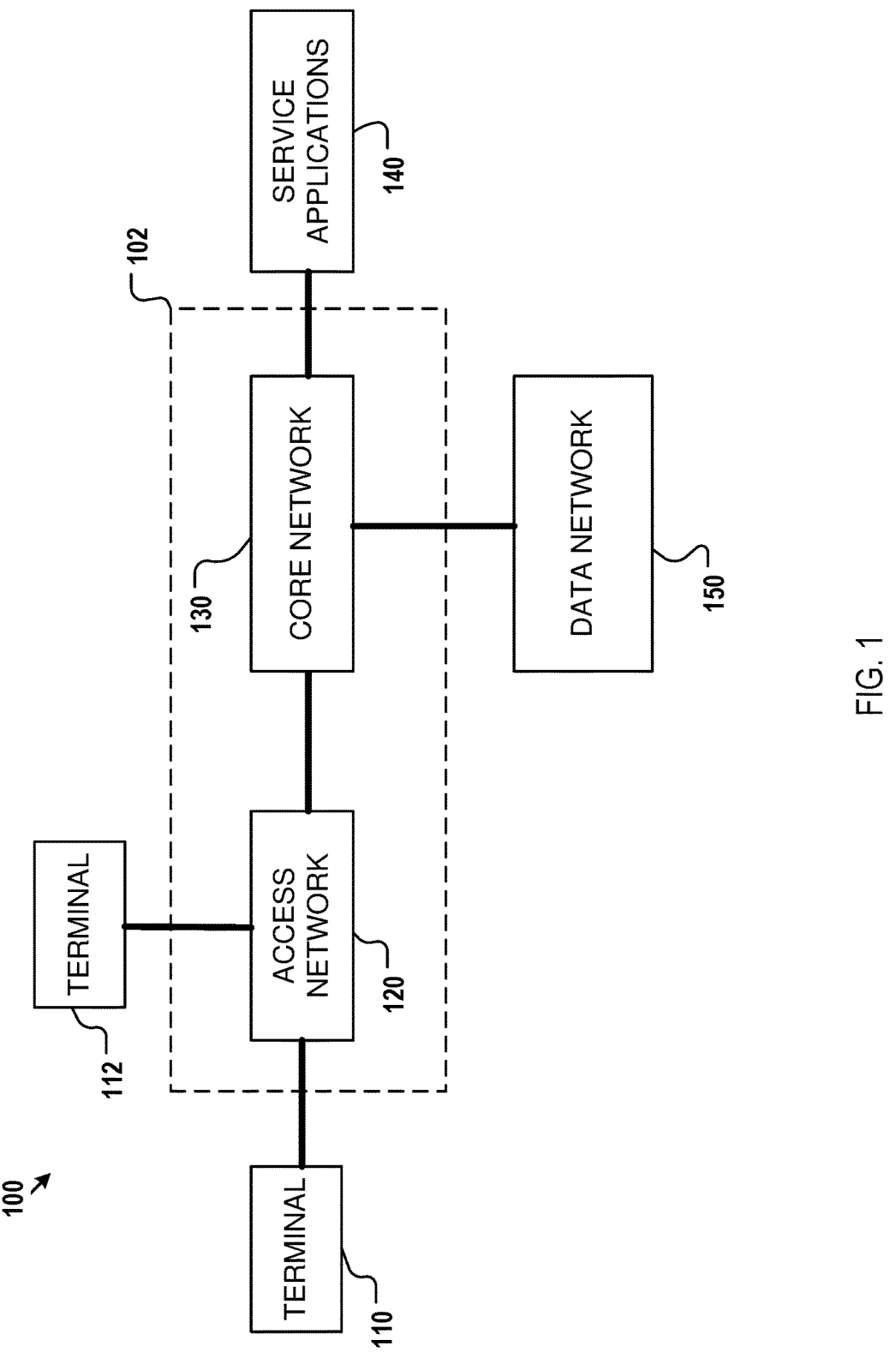
FIG. 1 shows an exemplary communication network including terminal devices, a carrier network, data network, and service applications.

An exemplary communication network, shown as 100 in FIG. 1, may include terminal devices 110 and 112, a carrier network 102, various service applications 140, and other data networks 150. The carrier network 102, for example, may include access networks 120 and a core network 130. The carrier network 102 may be configured to transmit voice, data, and other information (collectively referred to as data traffic) among terminal devices 110 and 112, between the terminal devices 110 and 112 and the service applications 140, or between the terminal devices 110 and 112 and the other data networks 150. Communication sessions and corresponding data paths may be established and configured for such data transmission. The Access networks 120 may be configured to provide terminal devices 110 and 112 network access to the core network 130. The core network 130 may include various network nodes or network functions configured to control the communication sessions and perform network access management and data traffic routing. The service applications 140 may be hosted by various application servers that are accessible by the terminal devices 110 and 112 through the core network 130 of the carrier network 102. A service application 140 may be deployed as a data network outside of the core network 130. Likewise, the other data networks 150 may be accessible by the terminal devices 110 and 112 through the core network 130 and may appear as either data destination or data source of a particular communication session instantiated in the carrier network 102.

The core network 130 of FIG. 1 may include various network nodes or functions geographically distributed and interconnected to provide network coverage of a service region of the carrier network 102. These network nodes or functions may be implemented as dedicated hardware network elements. Alternatively, these network nodes or functions may be virtualized and implemented as virtual machines or as software entities. A network node may each be configured with one or more types of network functions. These network nodes or network functions may collectively provide the provisioning and routing functionalities of the core network 130. The term "network nodes" and "network functions" are used interchangeably in this disclosure.

Figure 2:
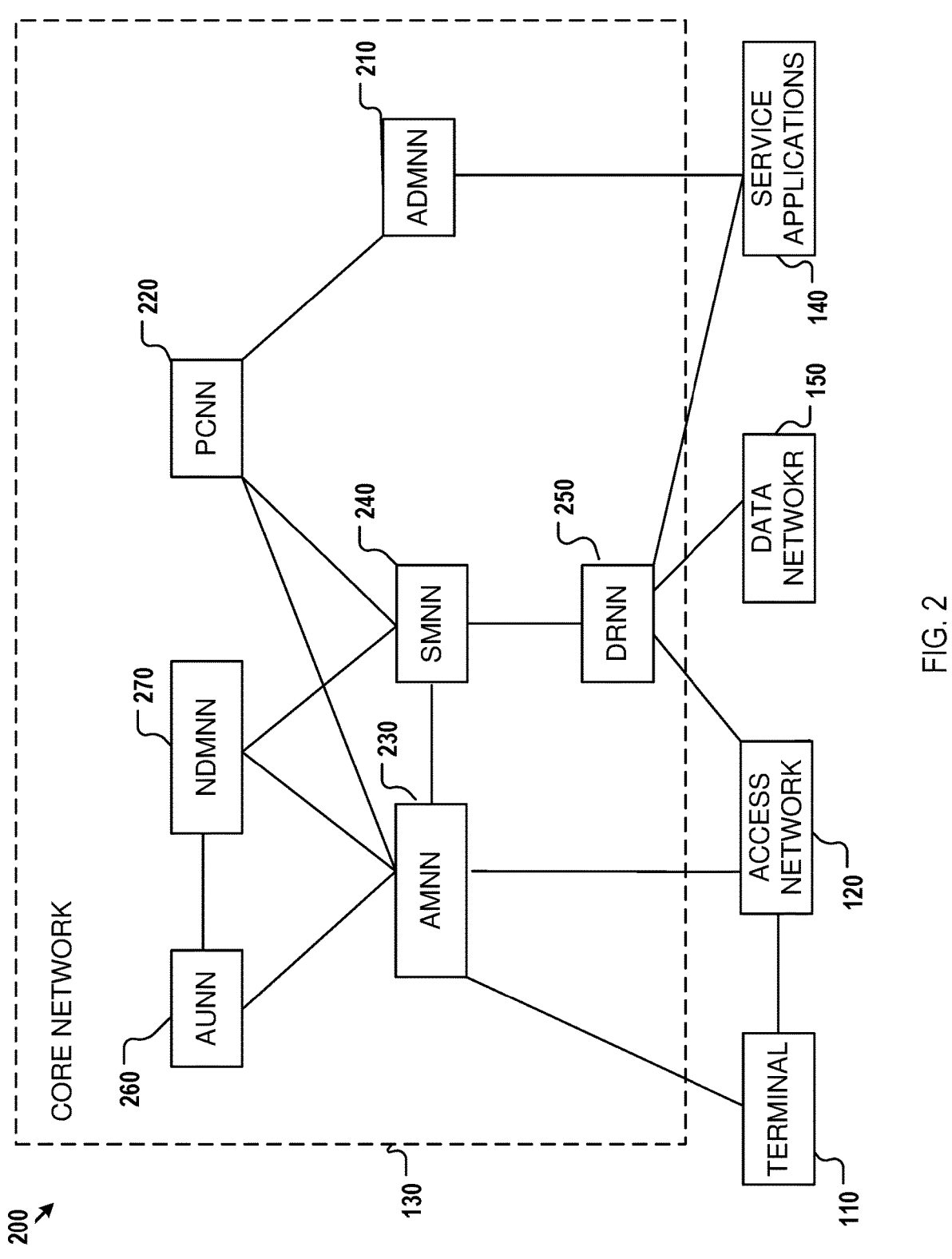
FIG. 2 shows exemplary network functions or network nodes in a communication network.

FIG. 2 further shows an exemplary division of network functions in the core network 130 of a communication network 200. While only single instances of network nodes or functions are illustrated in FIG. 2, those having ordinary skill in the art understand that each of these network nodes may be instantiated as multiple instances of network nodes that are distributed throughout the core network 130. As shown in FIG. 2, the core network 130 may include but is not limited to network nodes such as access management network node (AMNN) 230, authentication network node (AUNN) 260, network data management network node (NDMNN) 270, session management network node (SMNN) 240, data routing network node (DRNN) 250, policy control network node (PCNN) 220, and application data management network node (ADMNN) 210. Exemplary signaling and data exchange between the various types of network nodes through various communication interfaces are indicated by the various solid connection lines in FIG. 2. Such signaling and data exchange may be carried by signaling or data messages following predetermined formats or protocols.

Figure 3:
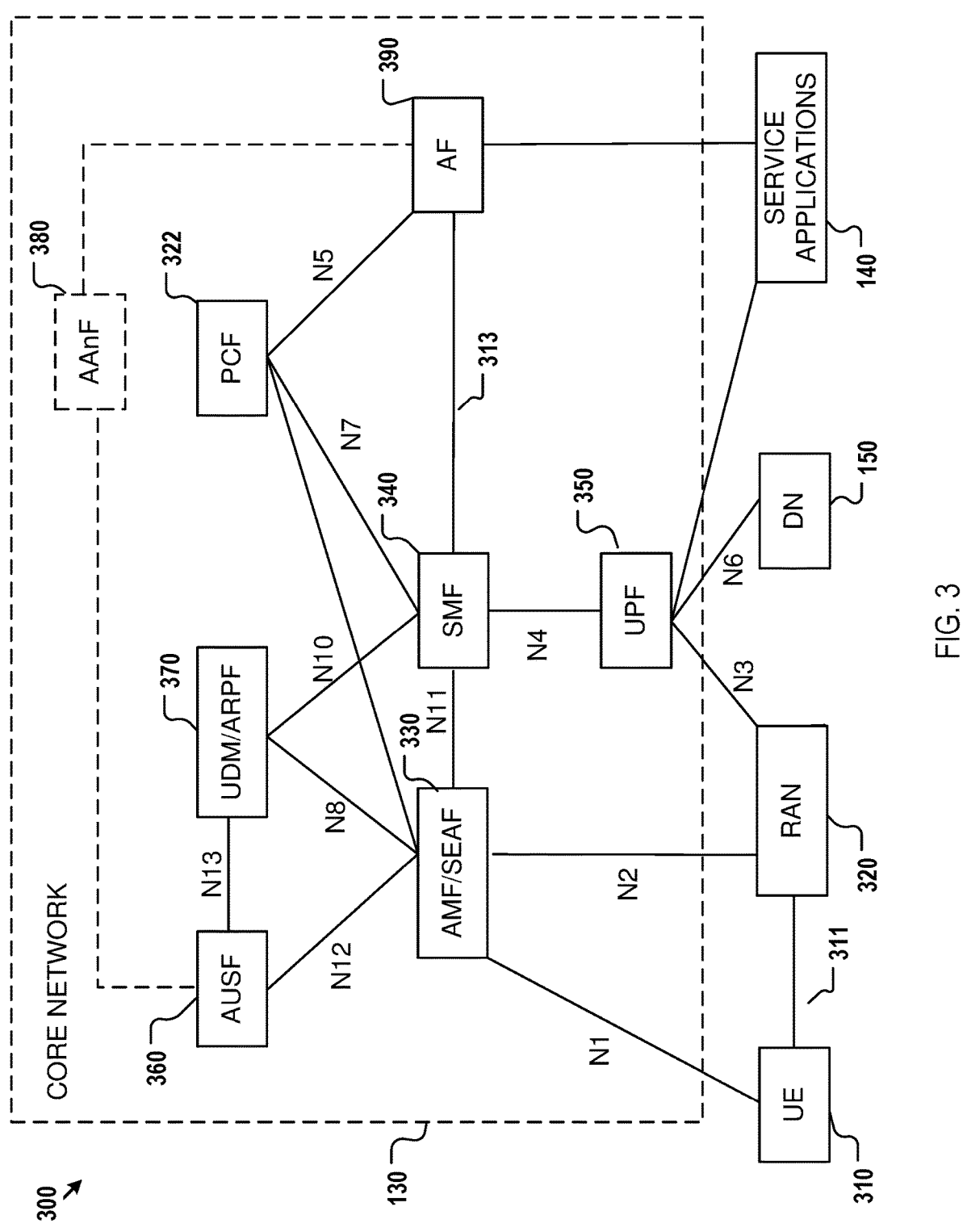
FIG. 3 shows exemplary network functions or network nodes in a wireless communication network.

The implementations described above in FIGS. 1 and 2 may be applied to both wireless and wireline communication systems. FIG. 3 illustrates an exemplary cellular wireless communication network 300 based on the general implementation of the communication network 200 of FIG. 2. FIG. 3 shows that the wireless communication network 300 may include user equipment (UE) 310 (functioning as the terminal device 110 of FIG. 2), radio access network (RAN) 320 (functioning as the access network 120 of FIG. 2), service applications 140, data network (DN) 150, and core network 130 including access management function (AMF) 330 (functioning as the AMNN 230 of FIG. 2), session management function (SMF) 340 (functioning as the SMNN 240 of FIG. 2), application function (AF) 390 (functioning as the ADMNN 210 of FIG. 2), user plane function (UPF) 350 (functioning as the DRNN 250 of FIG. 2), policy control function 322 (functioning as the PCNN 220 of FIG. 2), authentication server function (AUSF) 360 (functioning as the AUNN 260 of FIG. 2), and universal data management (UDM) function 370 (functioning as the UDMNN 270 of FIG. 2). Again, while only single instances for some network functions or nodes of the wireless communication network 300 (the core network 130 in particular) are illustrated in FIG. 3, those of ordinary skill in the art understand that each of these network nodes or functions may have multiple instances that are distributed throughout the wireless communication network 300.

In FIG. 3, the UE 310 may be implemented as various types of mobile devices that are configured to access the core network 130 via the RAN 320. The UE 310 may include but is not limited to mobile phones, laptop computers, tablets, Internet-Of-Things (IoT) devices, distributed sensor network nodes, wearable devices, and the like. The RAN 320 for example, may include a plurality of radio base stations distributed throughout the service areas of the carrier network. The communication between the UE 310 and the RAN 320 may be carried in over-the-air (OTA) radio interfaces as indicated by 311 in FIG. 3.

Continuing with FIG. 3, the UDM 370 may form a permanent storage or database for user contract and subscription data. The UDM may further include an authentication credential repository and processing function (ARPF, as indicated in 370 of FIG. 3) for storage of long-term security credentials for user authentication, and for using such long-term security credentials as input to perform computation of encryption keys as described in more detail below. To prevent unauthorized exposure of UDM/ARPF data, the UDM/ARPF 370 may be located in a secure network environment of a network operator or a third-party.

The AMF/SEAF 330 may communicate with the RAN 320, the SMF 340, the AUSF 360, the UDM/ARPF 370, and the PCF 322 via communication interfaces indicated by the various solid lines connecting these network nodes or functions. The AMF/SEAF 330 may be responsible for UE to non-access stratum (NAS) signaling management, and for provisioning registration and access of the UE 310 to the core network 130 as well as allocation of SMF 340 to support communication need of a particular UE. The AMF/SEAF 330 may be further responsible for UE mobility management. The AMF may also include a security anchor function (SEAF, as indicated in 330 of FIG. 3) that, as described in more detail below, and interacts with AUSF 360 and UE 310 for user authentication and management of various levels of encryption/decryption keys. The AUSF 360 may terminate user registration/authentication/key generation requests from the AMF/SEAF 330 and interact with the UDM/ARPF 370 for completing such user registration/authentication/key generation.

The SMF 340 may be allocated by the AMF/SEAF 330 for a particular communication session instantiated in the wireless communication network 300. The SMF 340 may be responsible for allocating UPF 350 to support the communication session and data flows therein in a user data plane and for provisioning/regulating the allocated UPF 350 (e.g., for formulating packet detection and forwarding rules for the allocated UPF 350). Alternative to being allocated by the SMF 340, the UPF 350 may be allocated by the AMF/SEAF 330 for the particular communication session and data flows. The UPF 350 allocated and provisioned by the SMF 340 and AMF/SEAF 330 may be responsible for data routing and forwarding and for reporting network usage by the particular communication session. For example, the UPF 350 may be responsible for routing end-end data flows between UE 310 and the DN 150, between UE 310 and the service applications 140. The DN 150 and the service applications 140 may include but are not limited to data network and services provided by the operator of the wireless communication network 300 or by third-party data network and service providers.

Figure 7:
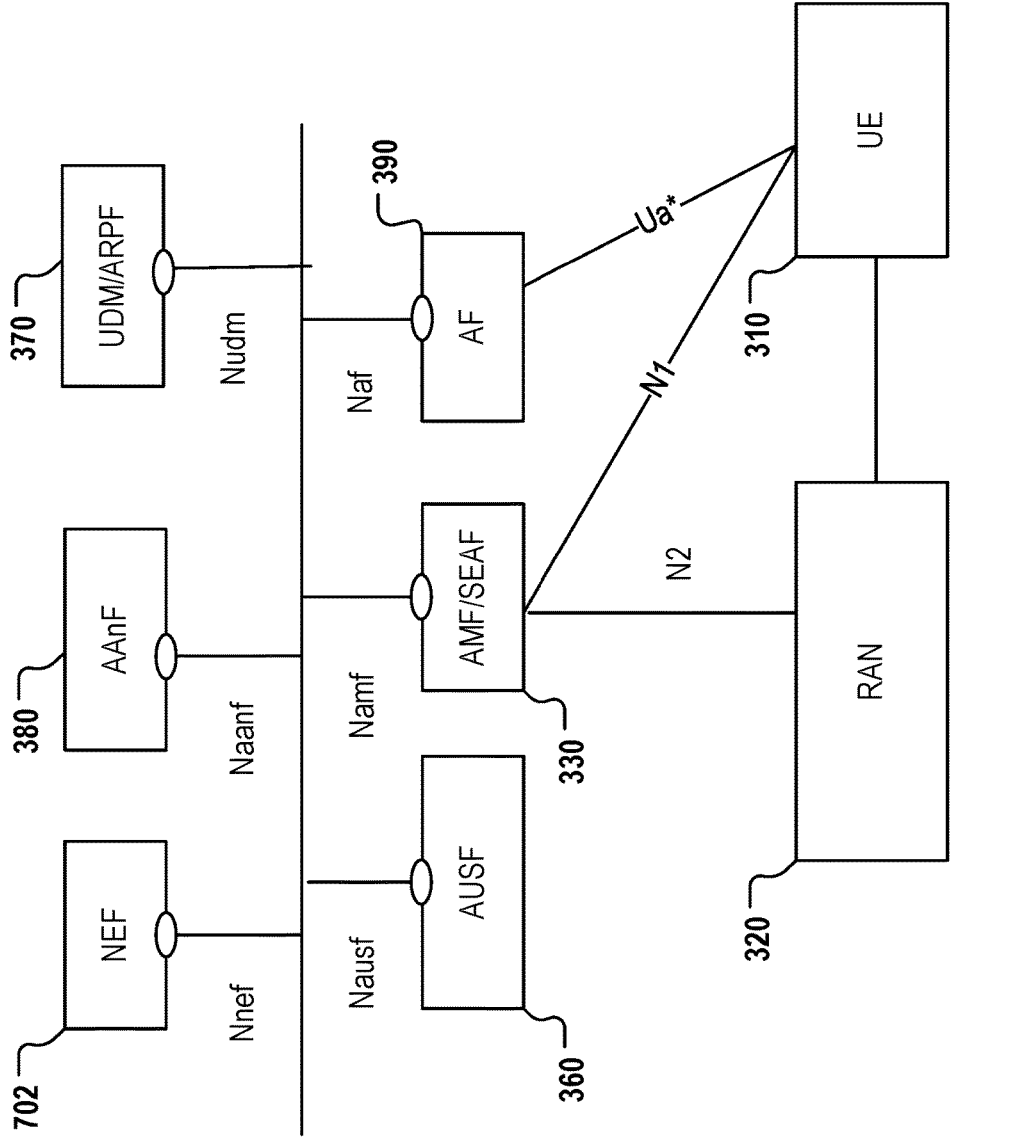
FIG. 7 shows an exemplary architectural view and various network nodes and network functions for subscription to an application key management service and generation of keys at various levels for enabling encrypted communication between terminal devices and service applications in a wireless communication network.

The service applications 140 may be managed and provisioned by the AF 390 via, for example, network exposure functions provided by the core network 130 (not shown in FIG. 3, but is shown in FIG. 7 which is described below). The SMF 340, in managing a particular communication session involving a service application 140 (e.g., between the UE 310 and the service application 140), may interact with the AF 390 associated with service application 140 via a communication interface indicated by 313.

The PCF 322 may be responsible for managing and providing various levels of policies and rules applicable to a communication session associated with the UE 310 to the AMF/SEAF 330 and SMF 340. As such, the AMF/SEAF 330, for example, may assign SMF 340 for the communication session according to policies and rules associated with the UE 310 and obtained from the PCF 322. Likewise, the SMF 340 may allocate UPF 350 to handle data routing and forwarding of the communication session according to policies and rules obtained from the PCF 322.

While FIGS. 2-14 and the various exemplary implementations described below are based on cellular wireless communication networks, the scope of this disclosure is not so limited and the underlying principles are applicable to other types of wireless and wireline communication networks.

Network identity and data security in the wireless communication network 300 of FIG. 3 may be managed via user authentication processes provided by the AMF/SEAF 330, the AUSF 360, and the UDM/ARPF 370. In particularly, the UE 310 may first communicate with AMF/SEAF 330 for network registration and may then be authenticated by the AUSF 360 according to user contract and subscription data in the UDM/ARPF 370. Communication sessions established for the UE 310 after user authentication to the wireless communication network 300 may then be protected by the various levels of encryption/decryption keys. The generation and management of the various keys may be orchestrated by the AUSF 360 and other network functions in the communication network.

The authentication of the UE 310 to the wireless communication network 300 may be based on verification of network identity associated with the UE 310. In some implementations, the UE 310 may include an identify module in addition to a main mobile equipment (ME). The ME, for example, may include the main terminal device having information processing capabilities (one or more processors and one or more memories) and installed with a mobile operating system and other software components to provide communication and processing needs for the UE 310. The identity module may be included with the UE 310 for identifying and authenticating the user to the communication network, and to associate the user with the ME. The identity module may be implemented as various generations of a subscriber identification module (SIM). For example, the identity module may be implemented as a universal subscriber identity module (USIM) or universal integrated circuit card (UICC). The identity module may include a user identification or a derivative thereof. The user identification may be assigned by the operator of the communication network when the user initially subscribes to the wireless communication network 300.

The User identification, for example, may include a subscription permanent identifier (SUPI) assigned by the operator of the wireless communication network to the user. In some implementations, the SUPI may include an international mobile subscriber identification number (IMSI), or a network access identifier (NAI). Alternative to SUPI, the user identification may be provided in the form of a hidden identification such as subscription concealed identifier (SUCI). In a SUCI, the identification of the user may be concealed and protected by encryption. For example, a SUCI may include: 1) a SUPI type which may occupy a predetermined number of information bits (e.g., three-bits for value 0-7, where the value 0 may indicate that the user identification is of IMSI type, value 1 may indicate that the user identification is of the NAI type, and other values may be reserved for other possible types); 2) home network identifier for the wireless network that the user subscribes to, which may include a mobile country code (MCC) and a mobile network code (MNC) for the operator of the wireless communication network 300 when the SUPI for the user is of IMSI type, and may alternatively include an identifier specified in, e.g., Section 2.2 of IETF RFC 7542, when the SUPI for the user is of the NAI type; 3) routing indicator (RID) assigned by the operator of the wireless communication network 300, which together with the home network identifier above determines the AUSF and UDM associated with the UE 310; 4) protection scheme identifier (PSI) for indicating a choice between no protection (null-scheme) or with protection (non-null-scheme); 5) home network public key identifier for specifying an identifier for a public key provided by the home network for protecting the SUPI (this identifier value may be set as zero when the PSI above indicates null-scheme); and 6) a scheme output which may include a mobile subscriber identification number (MSIN) portion of the IMSI or the NAI encrypted by the home network public key using, e.g., an elliptical curve encryption when the PSI above indicates a non-null-scheme, and may include the MSIN or NAI (without encryption) when the PSI above indicates a null-scheme. As an example for the SUCI, when the IMSI is 234150999999999, i.e., MCC=234, MNC=15, and MSIN=0999999999, and assuming that the RID is 678 and that the home network public key identifier is 27, an unprotected SUCI may include {0, (234, 15), 678, 0, 0, and 0999999999}, and a protected SUCI may include {0, (234, 15), 678, 1, 27, <elliptic curve encryption of 0999999999 using the public key indicated by public key identifier 27>}.

Because portions the data paths of the communication sessions between the UE 310 with other UEs, the DN 150, or the service applications 140 via the core network 130 may be outside of a secure communication environment within, e.g., the core network 130, user identity and user data transmitted in these data paths may thus be exposed to unsecure network environment and may be subject to security breaches. As such, it may be preferable to further protect the data transmitted in the communication sessions using various levels of encryption/decryption keys. As indicated above, these keys may be managed by the AUSF 360 in conjunction with the user authentication process to the wireless communication network 300. These encryption/decryption keys may be organized in multiple levels and in a hierarchical manner. For example, a first-level base key may be generated by the AUSF 360 for the UE 310 upon initial subscription to the service of the wireless communication network 300. A second level base key may be configured for the UE 310 upon each registration and authentication to the wireless communication network. Such a second-level base key may be valid during a registration session for the UE 310 and may be used as a base key for generating other higher level keys. An example of such higher level keys may include, an anchor key that may be used to derive keys of even higher levels for use as actual encryption/decryption keys for transmitting data in communication sessions.

Such multi-level key scheme may be particularly useful for communication sessions involving the UE 310 and service applications 140. In particular, an application anchor key may be generated based on a base key and managed as a security anchor for communications between the UE 310 and multiple service applications. Different communication sessions with different service applications 140 for the UE 310 may use different data encryption/decryption keys. These different data encryption/decryption keys may each be independently generated and managed based on the anchor key.

In some implementations, the core network 130 may be configured to encompass a special architecture for authentication and key management for service applications (AKMA). The wireless communication network 300, for example, may further include AKMA Anchor functions (AAnFs) or network nodes in its core network 130. An exemplary AAnF 380 is illustrated in FIG. 3. The AAnF 380 may be responsible for generation and management of data encryption/decryption keys for various service applications in collaboration with the AUSF 360 and various AFs 390 associated with the various service applications. The AAnF 380 may further be responsible for maintenance of the security context for the UE 310. For example, the functionality of the AAnF 380 may be similar to the bootstrapping server function (BSF) in general bootstrapping architecture (GBA). Multiple AAnFs 380 may be deployed in the core network 130 and each AAnF 380 may be associated with and responsible for key management of one or more service applications and corresponding AFs 390.

Figure 4:
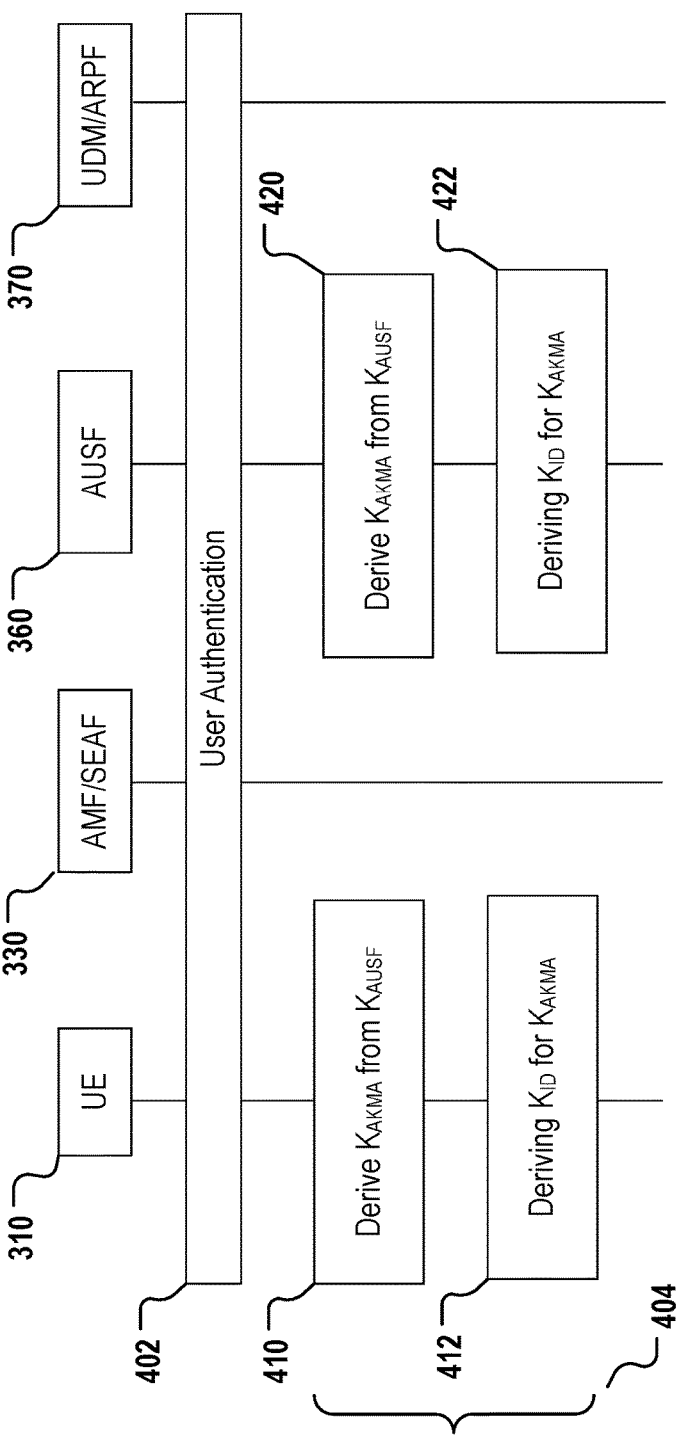
FIG. 4 shows an exemplary implementation for user authentication and generation of application anchor key in a wireless communication network.
Figure 5:
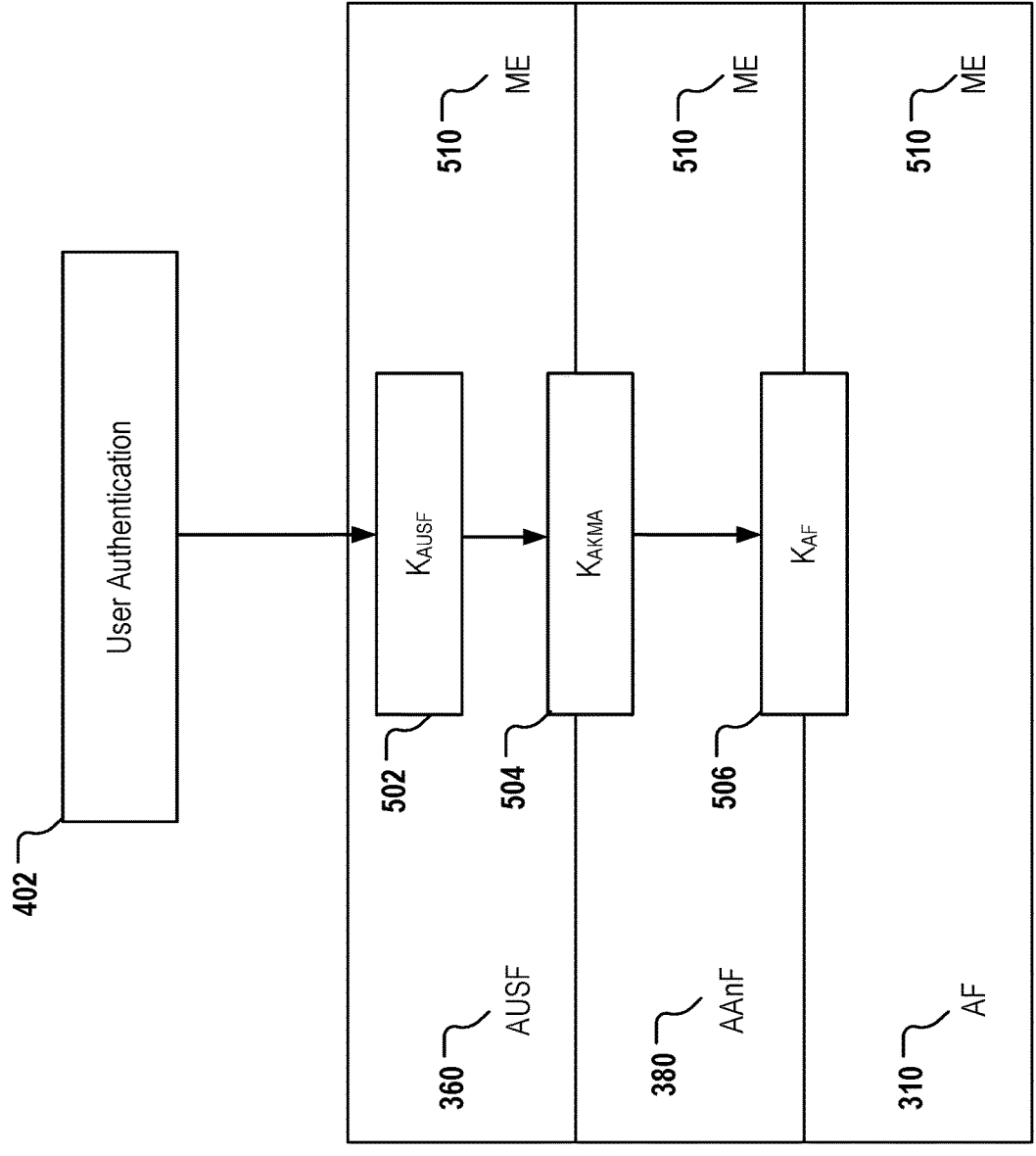
FIG. 5 shows an exemplary functional view of various network nodes and network functions for the generation of keys at various levels for enabling encrypted communication between terminal devices and service applications in a wireless communication network.

FIGS. 4 and 5 illustrates exemplary implementations for the hierarchical AKMA above. For example, FIG. 4 illustrates an implementation 400 for generation of a base key and an anchor key for communication sessions involving a service application. Specifically, the implementation 400 may include user authentication procedure 402 and the anchor key generation procedure 404. The user authentication procedure 402, for example, may involve actions from the UE 310, the AMF/SEAF 330, the AUSF 360, and the UDM/ARPF 370. For example, the UE 310, upon entering the wireless communication network, may communicate a network registration and authentication request to the AMF/SEAF 330. Such request may be forwarded by the AMF/SEAF 330 to the AUSF 360 for processing. During the authentication process, the AUSF 360 may obtain user contract and subscription information from the UDM/ARPF 370. The authentication process for a 5G wireless system, for example, may be based on 5G-AKA (Authentication and Key Agreement) protocol or EAP-AKA (Extended Authentication Protocol-AKA). Upon successful authentication, an authentication vector may be generated by the UDM/ARPF 370 and such authentication vector may be transmitted to the AUSF 360. Following successful user authentication procedure 402, a base key may be generated at both the UE 310 side and the AUSF 360 at the network side. Such a base key may be referred to as $K_{AUSF}$.

As further shown by 410 and 420 in FIG. 4, an anchor key may be derived based on the base key $K_{AUSF}$ at both the UE 310 and the AUSF 360 in the anchor key generation procedure 404. Such an anchor key, may be referred to as $K_{AKMA}$. As further shown by 412 and 422 in FIG. 4, an identifier for the anchor key $K_{AKMA}$ may be generated at the UE 310 and the AUSF 360. Such an identifier may be referred to as $K_{ID}$.

FIG. 5 further illustrates an exemplary implementation 500 for generation of an application key 506 for encrypted communication between the UE and a service application, in addition to the generation of the base key $K_{AUSF}$ 502 and the anchor key $K_{AKMA}$ 504. As shown in FIG. 5, the application key 506, denoted as $K_{AF}$, may be generated on both the network side and the UE side based on the anchor key $K_{AKMA}$ 504. Particularly on the network side, while the anchor key $K_{AKMA}$ 504 may be generated by the AUSF 360 based on the base key $K_{AUSF}$ 502, the generation of the application key $K_{AF}$ 506 may involve the AAnF 380. On the UE side of the FIG. 5, the generation of the anchor key $K_{AKMA}$ 504 and application key $K_{AF}$ 506 is illustrated as being performed by the ME (mobile equipment) portion 510 of the UE. In particular, such key generation on the UE side may mainly involve utilizing the processing power and capability of the ME after the user authentication procedure 402 involving the identity module (e.g., SIM) within the UE is completed.

In the application key management scheme illustrated in FIGS. 4 and 5, one or more AAnFs 380 may be distributed in the core network and each of the one or more AAnFs 380 may be associated with one or more AFs 390. As such, each of the one or more AAnFs 380 may be associated with one or more service applications and may be responsible for generation and management of application keys for encrypted communication involving these service applications. While the application keys each for one of these service applications may all be generated based on the same anchor key $K_{AKMA}$ 504, these application keys, on the network side, may be generated independently by the corresponding AAnF 380.

Figure 6:
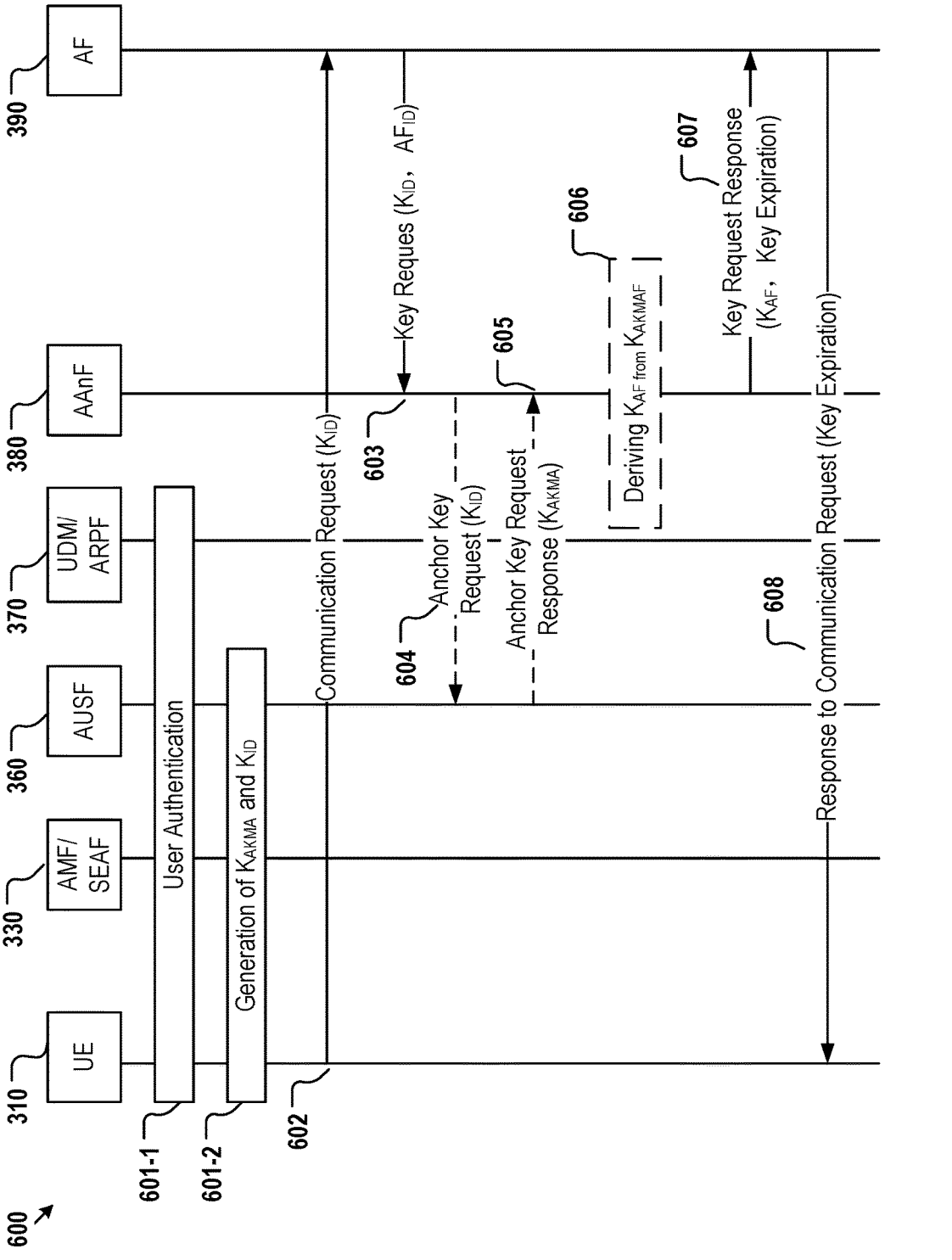
FIG. 6 shows an exemplary logic flow for generation of various levels of encryption keys for enabling encrypted communication between terminal devices and service applications in a wireless communication network.

FIG. 6 further illustrates an exemplary logic flow 600 for the generation of an application key associated with a service application for enabling encrypted communication between the UE 310 and the corresponding AF 390. In Step 601-1, the UE 310 may first be successfully registered and authenticated by the AMF/SEAF 330, the AUSF 360, and the UDM/ARPF 370 (similar to 402 in FIG. 4). Following the UE registration and authentication, the base key $K_{AUSF}$ may be generated. In Step 601-2, the anchor key $K_{AKMA}$ and corresponding identifier $K_{ID}$ may be generated on both the UE side and the network side (similar to 410, 412, 420, and 422 of FIG. 4). In Step 602, the UE 310 initiates a communication session with the service application associated with the AF 390 by sending a communication request message. The request may include the identifier $K_{ID}$ generated in Step 601-2 and associated with the anchor key $K_{AKMA}$ generated in Step 601-1. In Step 603, the AF 390 may send a key request message to the AAnF 380, where the key request message include the anchor key identifier $K_{ID}$ and an identifier of the AF 390, $AF_{ID}$. In Step 604, the AAnF 380 determines whether the anchor key $K_{AKMA}$ associated with the anchor key identifier $K_{ID}$ can be located in AAnF 380. If $K_{AKMA}$ is found in AAnF 380, the logic flow 600 continues to Step 607. Otherwise, the AAnF 380 may send an anchor key request to AUSF 360 in Step 604 carrying the anchor key identifier $K_{ID}$, and receive the anchor key $K_{AKMA}$ from the AUSF 360 in Step 605 after the AUSF 360 identifies the anchor key $K_{AKMA}$ according to the anchor key identifier $K_{ID}$ in a response to the anchor key request from the AAnF 380. In Step 606, the AAnF 380 derives the application key $K_{AF}$ based on the anchor key $K_{AKMA}$ if the $K_{AF}$ has not been previously derived at the AAnF 380 yet or has already expired. The derived $K_{AKMA}$ may be associated with an application key validity time period (or expiration time). In Step 607, the AAnF 380 may send the application key $K_{AF}$ and the corresponding expiration time to the AF 390. After obtaining the $K_{AKMA}$ from the AAnF 380, the AF may finally respond to the communication request sent from the UE 310 in Step 602. The response in step 608, for example, may include the expiration time for $K_{AF}$ and such expiration time may be recorded and stored by the UE 310.

FIG. 7 illustrates another exemplary architectural view 700 for the AKMA implementations by the various network functions disclosed above. The various functions such AMF/SEAF 330, AUSF 360, AF 390, UDM/ARPF 370, UE 310, and AAnF 380 are illustrated to interact with one another according to the exemplary implementations described above via the various interfaces associated with these network functions, such as the Namf interface for the AMF/SEAF 330, the Nausf interface for the AUSF 360, the Naf interface from the AF 390, the Nudm interface for the UDM/ARPF 370, and the Naanf interface for the AAnF 380, as indicated in FIG. 7. FIG. 7 further shows the network exposure function (NEF) 702 as a gateway for providing capability exposure of the core network to the AF 390 associated with the service applications. In the exemplary architectural view 700 of FIG. 7, the UE 310 may communicate with the AF 390 via the Ua interface, and the AMF/SEAF 330 via the Ni interface. The communication from the UE 310 to the core network is relayed by the RAN 320.

In the implementations described above, the AUSF, the UDM, the AUSF, and the AAnF belong to the home network of the UE 310. They may be located within a secure network environment provided by the operator or authorized third party and may not be exposed to unauthorized network access. In a roaming scenario, the home UDM and AUSF provide authentication information for the UE, maintain roaming location of the UE, and supply subscription information to the visited network.

The application key generation and encryption/decryption of the data transmitted in the communication sessions with the service applications may involve substantial data processing that requires a significant level of computing capability and energy consumption. Some lower-end UEs that are incapable of such level of computation may not be able to communicate with the service applications if the data encryption/decryption described above is made mandatory. In some further implementations described below, options may be provided such that a UE may communicate with the service applications with the data flows therein either protected or unprotected by application keys. As such, a lower-end UE that may not be capable of timely performing application key generation and data encryption/decryption may nevertheless have the option of requesting an unprotected communication session with the service applications, thereby avoiding having to perform any complex key generation and data encryption/decryption.

Such options may be provided via a service subscription mechanism. For example, AKMA may be provided as a service that may be subscribed to by UEs. For example, a UE may either subscribe to or not subscribe to the AKMA service. When the UE subscribe to the AKMA service, the UE may request a protected communication session with a service application. The UE and the various network functions (such as the AAnF 380) may correspondingly carry out the necessary application key generation for data encryption/decryption. Otherwise, when the UE does not have subscription to the AKMA service, the UE may only request an un-protected communication session with a service application and no application key and data encryption/decryption may be needed.

For another example, rather than subscribing to the AKMA service in its entirety, a UE may subscribe to the AKMA service for none, some, or all of the service applications available and registered with the communication network via the network exposure functions. When the UE have subscription to the AKMA service for a particular service application, the UE may request a protected communication session with that service application. The UE and the various network functions (such as the AAnF 380) may correspondingly carry out the necessary application key generation for data encryption/decryption. Otherwise, when the UE does not have subscription to the AKMA service for a particular service application, the UE may only request an un-protected communication session with that service application and no applications key and data encryption/decryption may be needed for communication with that particular service application.

The UE subscription information of the AKMA service for the service applications may be managed on the network side by the UDM/ARPF 370. In particular, the UDM/ARPF 370 may keep track of the AKMA service subscription information for each UE. The UDM/ARPF 370 may be configured to provide an interface for other network functions of the communication network, such as the AUSF 360, to request AKMA service subscription information of a particular UE. The UDM/ARPF 370, for example, may deliver UE AKMA service subscription information to the AUSF 360 via the Nudm interface illustrated in FIG. 7 upon request. In these implementations, the UDM/ARPF 370 is essentially configured to act as a repository of the AKMA service subscription information in addition to other user data management functionalities. Alternatively, dedicated network functions separate from and other than the UDM/ARPF 370 may be included in the core network and configured to manage the AKMA service subscription.

Such subscription information may be recorded in various forms in the UDM/ARPF 370. The subscription information may be indexed by UE. For example, each AKMA service subscription may be associated with an UE identifier. Each AKMA service subscription may further include one or more of (1) an indicator for whether the UE subscribes to the AKMA service, (2) identifiers for one or more AAnFs associated with the subscription of the UE, and (3) the validity time periods (or expiration time) of the anchor keys $K_{AKMA}$ corresponding to the AAnFs. The identifier for an AAnF may be provided in the form of a network address of the AAnF. Alternatively, the identifier of the AAnF may be provided in the form of a full qualified domain name (FQDN) of the AAnF. Each UE may correspond to one or more AAnFs to which it subscribes.

Correspondingly, the identity module of the UE (e.g., a University Subscriber Identity Module (USIM) or Universal Integrated Identity Card (UICC)) may include the AKMA service subscription information for the UE. Such subscription information may include one or more of (1) an indicator for whether the UE subscribes to the AKMA service, (2) identifiers of one or more AAnFs associated with the AKMA service subscription of the UE, (3) the validity time periods of the anchor keys $K_{AKMA}$ corresponding to the AAnFs, and (4) identifiers of AFs corresponding to application services subscribed by the UE. Again, the identifier for an AAnF may be provided in the form of a network address of the AAnF. Alternatively, the identifier of an AAnF may be provided in the form of an FQDN of the AAnF. Each UE may correspond to one or more subscribed AAnFs. Likewise, the identifier for an AF may be provided in the form of the network address of the AF. Alternatively, the identifier of the AF may be provided in the form of an FQDN of the AF. Each UE may correspond to one or more AFs. In some implementations, multiple AFs may be associated with a same AAnF, but each AF may only be associated with one AAnF.

Figure 8:
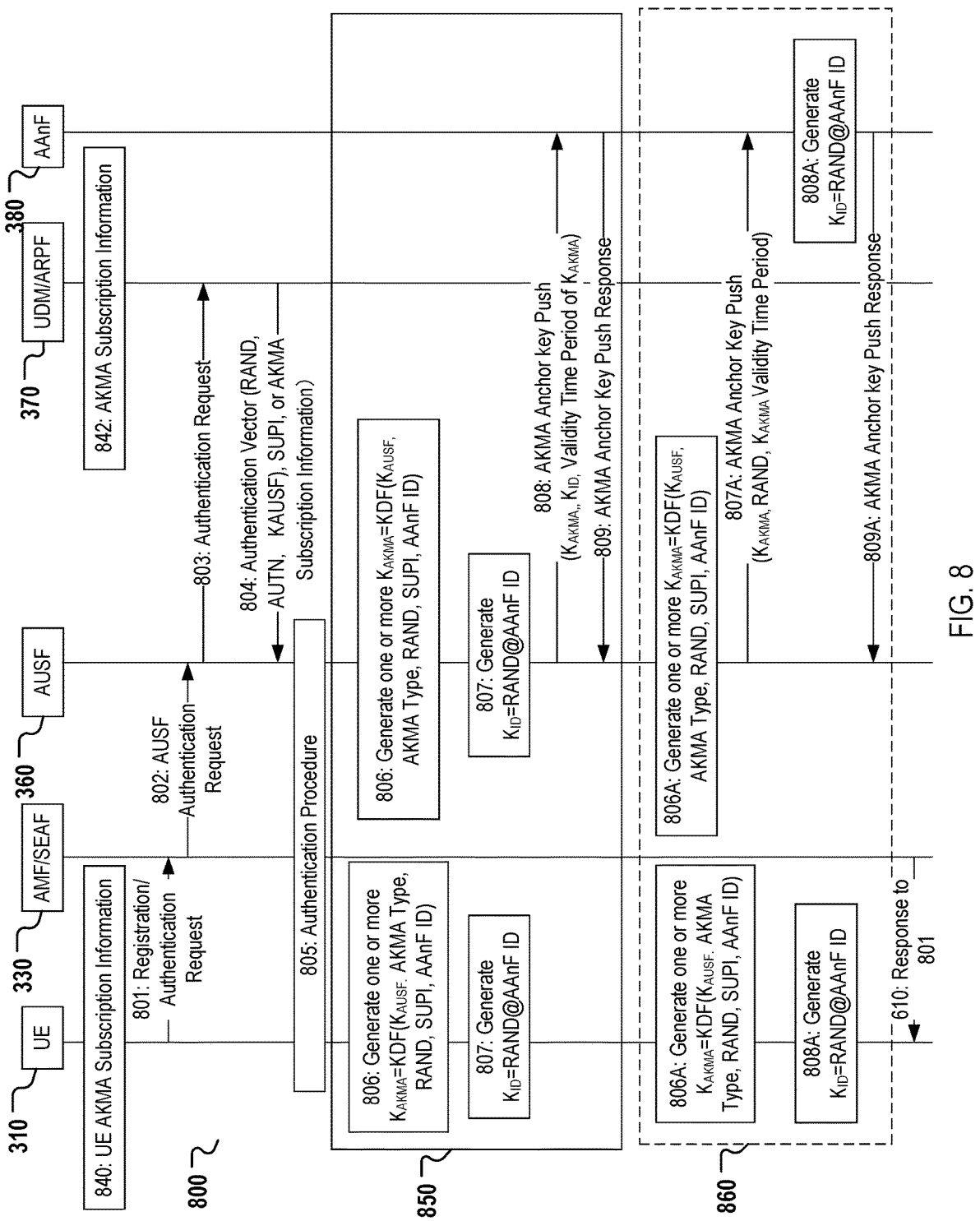
FIG. 8 shows an exemplary logic flow for subscription to an application key management service, user authentication, and generation of application anchor key for enabling encrypted communication between terminal devices and service applications in a wireless communication network.

FIG. 8 shows exemplary logic flows 800, 850, and 860 for user authentication and generation of the anchor key $K_{AKMA}$ when the UE has subscribed to the AKMA service. Logic flow 800 illustrates an exemplary UE registration and authentication procedure, whereas logic flow 850 illustrates an exemplary process for generation of the anchor key $K_{AKMA}$ and logic flow 860 illustrates another exemplary process for generation of the anchor key $K_{AKMA}$ alternative to the logic flow 850. As shown by 840, the UE 310 may subscribe to the AKMA service and the AKMA service subscription information corresponding to the UE 310 may be recorded in the UE 310. Such subscription information may include one or more combinations of: an indicator for whether the UE 310 has subscribed to the AKMA service; one or more AAnF identifiers; one or more AF identifiers; and AKMA anchor key validity time periods. As further indicated by 842, the corresponding user subscription information recorded in the UDM/ARPF 370 may include one or more of: an indicator for whether the UE 310 has subscribe to the AKMA service; one or more AAnF identifiers; and the AKMA anchor key validity time period. During the UE registration and authentication procedure, the UDM/ARPF 370 may transmit the AKMA service subscription information to the AUSF 360. Upon successful UE registration and authentication, the AUSF 360 may derive the AKMA anchor key based on the AKMA service subscription information received from the UDM/ARPF 370. In the meanwhile, the UE 310 may also derive the AKMA anchor key based on the AKMA service subscription information stored in the UE 310.

The specific exemplary steps for the UE registration/authentication and the AKMA anchor key generation are illustrated by steps 801 to 810 in FIG. 8. In Step 801, the UE 310 sends a request message to the AMF/SEAF 330 to initiate a registration/authentication of the UE 310 to the network. The AMF/SEAF 330 may be provided by the home network of the UE or by a visiting network in the scenario that the UE is roaming. The request message may include a user identifier of the UE 310, such as SUCI or 5G-Globally Unique Temporary UE Identity (5G-GUTI). In Step 802, the AMF/SEAF 330 sends an AUSF authentication request to AUSF 360 (e.g., a Nausf_UEAuthentication_Authenticate Request). Such AUSF request may include the SUCI or SUPI of the UE 310. In the case that the registration/authentication request in Step 801 includes 5G-GUTI, the AMF/SEAF 330 may first obtain SUPI from home AMF of the UE. If that fails, the AMF/SEAF 330 may obtain SUCI from the UE 310. The AUSF request may further include the identity or name of the servicing network (SN) for the UE 310. In Step 803, after the AUSF 360 (the home AUSF for the UE) determines that the SN name is valid, the AUSF 360 initiates a user authentication request message (e.g., a Nudm_UEAuthentication_Get Request) to the UDM/ARPF 370. Such user authentication request message may include SUCI or SUPI of the UE 310, and may further include the SN name.

Continuing with FIG. 8 in Step 804, the UDM/ARPF 370 receives the user authentication request message of Step 803, and may decrypt the SUCI contained in the message to obtain SUPI. The UDM/ARPF 370 then determines the type of user authentication (e.g., 5G-AKA or EAP-AKA) and generate an authentication vector. The UDM/ARPF 370 further queries its subscription data repository to determine whether the UE 310 has subscribed to the AKMA service, and if so, obtain AKMA service subscription information for the UE 310. The UDM/ARPF 370 then responds to the user authentication request message of Step 803 by a return message including the authentication vector, the SUPI decrypted from the SUCI, and/or the AKMA service subscription information for the UE 310 (e.g., Nudm_UEAuthentication_Get the response) to the AUSF 360. The authentication vector generated by the UDM/ARPF 370 and included in the return message may include, for example, an authentication token (AUTN), a random number (RAND), and/or various authentication keys. The AKMA service subscription information for the UE may include, for example, identifiers for one or more AAnFs, and or validity time period of the AKMA anchor key.

Further in Step 805, the AUSF 360 verifies the authentication vector sent form the UDM/ARPF 370 in Step 804 and initiates the main authentication procedure. Such authentication procedure, for example, may be based on 5G-AKA or EAP-AKA. After successful completion of the main authentication procedure, both the UE 310 and the AUSF 360 would have generated the base key $K_{AUSF}$. UE 310 and AMF/SEAF 330 would have further generated stratum and non-stratum access keys.

Logic flow 850 following Step 805 in FIG. 8 illustrates an exemplary implementation for anchor key generation. Specifically, in Step 806, after the UE main authentication logic flow 850 is successful, the UE 310 and the AUSF 360 may generate the AKMA anchor key $K_{AKMA}$=KDF ($K_{AUSF}$, AKMA Type, RAND, SUPI, AAnF identifier). The term "KDF" represents an exemplary key generation algorithm involving HMAC-SHA-256 (256-bit Hash-based Message Authentication Code for Secure Hash Algorithm). $K_{AUSF}$ represents the base key. The "AKMA type" parameter represent various AKMA type, for example, the AKMA may be based on the ME (the ME portion of the UE is responsible for key generation and encryption/decryption calculation). For another example, the AKMA may be based on UICC, where the processing capability in the UICC of the UE is used for key generation and encryption/decryption. The "RAND' parameter represents the random number in the authentication vector generated by the UDM/ARPF 370 in Step 804 above. The AAnF identifiers may include network addresses of the AAnFs or the FQDNs of the AAnFs. While the exemplary KDF calculation above lists all parameters discussed above, not all these parameters need to be included in the calculation. Any combinations of any of these parameters may be used for the KDF calculation and for the generation of $K_{AKMA}$ In some implementations, the $K_{AUSF}$ parameter may be made mandatory and the other parameters may be made optional. In some other implementations, the $K_{AUSF}$ parameter and the at least part of the AKMA subscription information (e.g., AKMA Type, AAnF identifier) may be made mandatory and the other parameters may be made optional.

In Step 807, the UE 310 and the AUSF 360 may generate an identifier for the AKMA anchor key as, for example, $K_{ID}$=RAND@AAnF identifier, or $K_{ID}$=base64encode (RAND) @ AAnF identifier. Here, RAND is the random number in the authentication vector obtained from the UDM/ARPF 370 above, and the AAnF identifier include the AAnF network address or FQDN address. The exemplary encoding method defined by "base64encode" is specified, for example in LEFT RFC 3548 protocol. Further in Step 808, the AUSF 360, after calculating the AKMA anchor key in Step 806 and the AKMA anchor key identifier in Step 807, may transmit a push message to the AAnF 380. The push message, for example, may include the anchor key $K_{AKMA}$, the anchor key identifier $K_{ID}$, The push message may further include the validity time period for the anchor key $K_{AKMA}$. The AAnF 380 may then store the anchor key $K_{AKMA}$ and anchor key identifier $K_{ID}$. The AAnF 380 may further identify a local validity time period for the anchor key $K_{AKMA}$ determined according to local key management strategies at the AAnF 380. The AAnF 380 may compare the local validity time period for the anchor key and the validity time period for the anchor key received from the AUSF 360 in Step 808 and use the smaller value as actual validity time period for the anchor key. If the validity time period for the anchor key is not in the message sent from the AUSF 360 to the AAnF 380 in Step 808, the AAnF 380 may then use the local validity time period as actual validity time period for the anchor key. If no local validity time period for the anchor key is found in the AAnF 380, then the validity time period received from the AUSF 360 in Step 808 may be used as the actual validity time period for the anchor key. Further in Step 809, the AAnF 380 transmits response to the AUSF 360 upon successful transmission of the push message from the AUSF 360 to the AAnF 380 in step 808.

Logic flow 860 further illustrates an exemplary implementation for anchor key generation alternative to the logic flow 850 above. Steps 806A, 807A, 808A, and 809A of the logic flow 860 correspond to Steps 806, 807, 808, and 809, respectively. The logic flow 860 is similar to the logic flow 850 except that the identifier $K_{ID}$ for the anchor key $K_{AKMA}$ is generated by the AAnF 380 rather than the AUSF 360 on the network side (as shown by Step 808A performed by the AAnF 380). Correspondingly, the push message sent from AUSF 360 to the AAnF 380 may include parameter RAND, which may be used as one of the components for the generation of $K_{ID}$ by the AAnF 380 at Step 808A. Details for the various other steps in the logic flow 860 may be found in the description above for the logic flow 850.

After a successful generation of the anchor key according to the logic flow 850 or 860 above, the UE 310 may initiate communication with the AF 390, as described in more detail below. Finally for FIG. 8, as shown by Step 810, the AMF/SEAF 330 may sent a response message to the UE 310 indicating a successful completion of the registration/authentication request of Step 801 and successful completion of anchor key generation for subscribed AAnF. In some other alternative implementations, the Step 810 may be performed prior to Step 806 for indicating a successful completion of the registration/authentication request of Step 801.

In the implementations above for FIG. 8, the AKMA service is offered as an option rather than being mandatory and is provided to the UE for subscription. The subscription information may be stored and managed by the UDM/ARPF 370 on the home network side and in the UE 310. As such, the UE 310 is provided options of either subscribing to the AKMA service or not subscribing to the AKMA service. In the case that the UE does not subscribe to the AKMA service (when, for example, the UE lacks the capability to handle the key generation and data encryption), the UE may forgo the process of generating application anchor keys and may communicate with application servers without using any application keys. In the case that the UE does subscribe to the AKMA, the subscription information may be optionally used, as shown by the optional parameter AAnF ID, and AKMA type in Step 806, 806A, 807, and 807A, for the generation of the AKMA anchor key and its identifier.

The application anchor key $K_{AKMA}$, once generated as described above in FIG. 8, may then be used as a basis for generation application key for encrypted communication between the UE 310 and a service application to which the UE 310 has subscribed to the AKMA service. As illustrated above with respect to FIG. 8, parameters such as the random number RAND in the authentication vector generated by the UDM/ARPF 370 may be used for constructing $K_{ID}$ (see, for example, Steps 807 and 808 in FIG. 8). The identifier $K_{ID}$ may be further used as search index to identify the corresponding AKMA anchor key during each communication between the UE 310 and the service applications. Frequent transmission of these parameters such as the RAND parameter through data path outside the secure environment of the core network may lead to security breach or leakage of these parameters. The exemplary implementations of application key generation for encrypted communication with a service application as illustrated in the logic flows of FIG. 9-12 and described below may provide schemes for reducing the security risk of these parameters.

In FIGS. 9-12, after main registration and authentication of the UE 310 and the generation of the application anchor key following, for example, the authentication and anchor key generation steps 801-806 as illustrated in FIG. 8, the UE 310 may generate an initial application key and send a request for communication to the AF associated with the service application. The AF may obtain the initial application key from the AAnF. The AAnF in the meanwhile may generate a new random number (NewRAND) or a new anchor key identifier and send the NewRAND or the new anchor key identifier to the UE 310 via the AF. The UE may then generate a new application key based on the NewRAND or the new anchor key identifier, and use the new application key to request and establish an actual communication session with the service application. The NewRAND and new anchor key identifier used for generating the new application key may be referred to as a key seed for the generation of the new application key.

As shown by 840 in FIGS. 9-12, it is assumed that the UE 310 has subscribed to the AKMA service and that the AKMA service subscription information stored in the UE 310 may include one or more combinations of: an indicator for whether the UE has subscribed to the AKMA service; one or more AAnF identifiers; one or more AF identifiers; and AKMA anchor key validity time period. As further indicated by 842 in FIG. 9-12, the corresponding user subscription information recorded in the UDM/ARPF 370 may include one or more of: an indicator for whether the UE has subscribe to the AKMA service; one or more AAnF identifiers; and the AKMA anchor key validity time period. The identifier for an AAnF may be provided in the form of a network address of the AAnF. Alternatively, the identifier of an AAnF may be provided in the form of an FQDN of the AAnF. Each UE may correspond to one or more subscribed AAnFs. Likewise, the identifier for an AF may be provided in the form of the network address of the AF. Alternatively, the identifier of the AF may be provided in the form of an FQDN of the AF. Each UE may correspond to one or more AFs. In some implementations, multiple AFs may be associated with a same AAnF, but each AF may only be associated with one AAnF.

Figure 9:
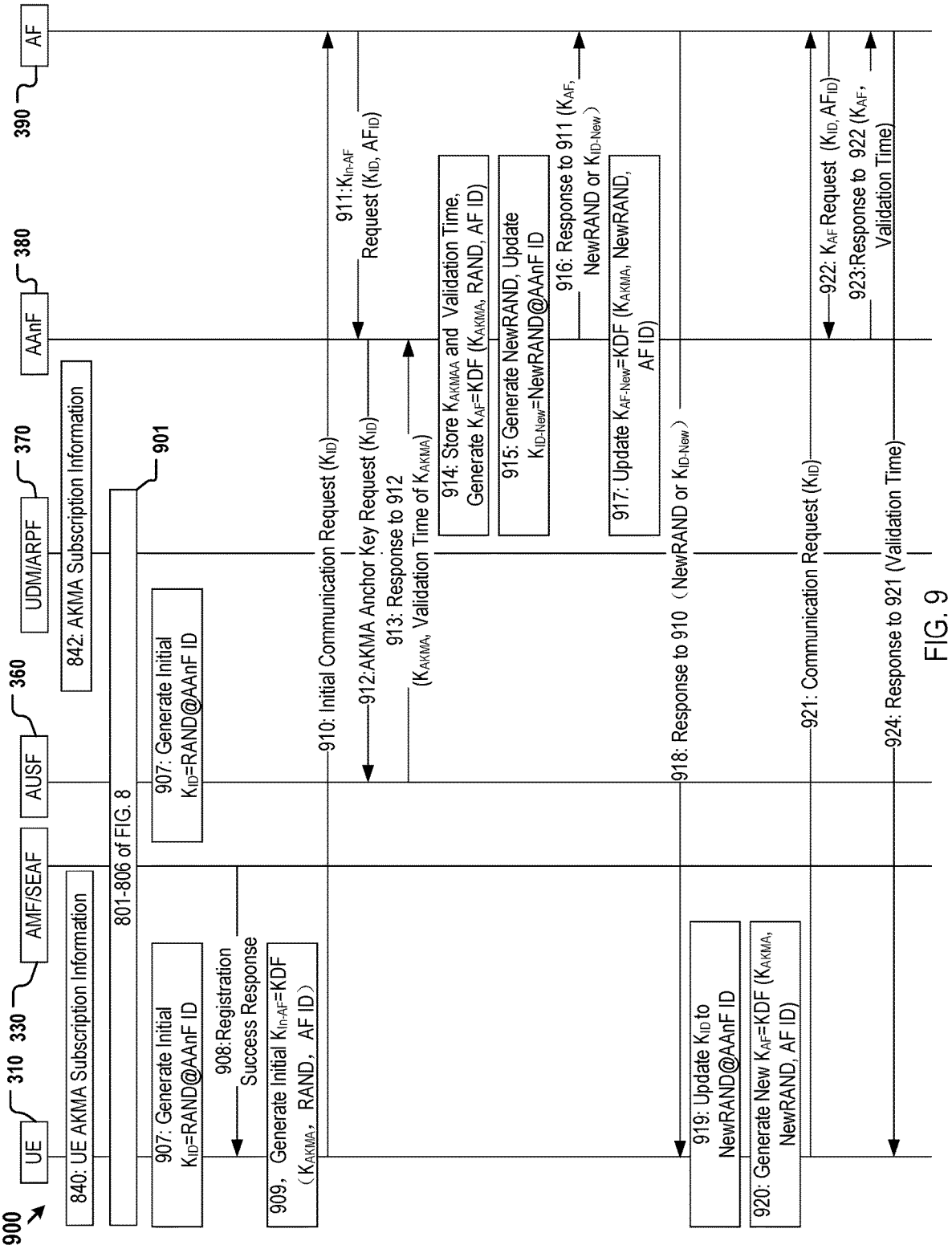
FIG. 9 shows an exemplary logic flow for subscription to an application key management service, user authentication, and generation of various levels of encryption keys for enabling encrypted communication between terminal devices and service applications in a wireless communication network.

Turning to the logic flow 900 of FIG. 9 and as shown in 901, the UE 310, the AMF/SEAF 330, the AUSF 360, and UDM/ARPF 370 may first perform the main registration and authentication of the UE 310 and the generation of the AKMA anchor key following the authentication and anchor key generation steps 801-806 as illustrated in FIG. 8. Details for the main authentication and AKMA anchor key generation are described above with respect to FIG. 8. In Step 907, the UE 310 and AUSF 360 generate an initial identifier for the AKMA anchor key as, for example, $K_{ID}$=RAND@AAnF ID, or $K_{ID}$=base64encode (RAND)@AAnF ID. Upon successful UE registration and authentication, in Step 908, the AMF/SEAF 330 communicates a response message to the UE 310 to indicate that the registration and authentication was successful. The Step 908 may be performed at other times. For example, Step 908 may be performed before step 806 among the procedure 901.

Continuing with FIG. 9, in Step 909, the UE 310 may generate an initial application key $K_{in\text{-}AF}$=KDF ($K_{AKMA}$, RAND, AF ID), where KDF represents the exemplary key generation algorithm described with respect to Step 806 of FIG. 8. In Step 910, the UE 310 sends an initial communication request to the AF 390 associated with the service application. The initial communication request, for example may include the identifier for the AKMA anchor key, $K_{ID}$. Further in Step 911, the AF 390 receives the initial communication request from the UE 310 and sends a request for the initial application key $K_{in\text{-}AF}$ to the AAnF 380 according to the AAnF ID included in $K_{ID}$. The request for the initial application key $K_{in\text{-}AF}$ from the AF 390, for example, may include $K_{ID}$ and identifier for the AF, $AF_{ID}$. The AAnF 380 may query for the AKMA anchor key $K_{AKMA}$ according to $K_{ID}$ sent from the AF 390 in Step 911. If the AAnF 380 finds the AKMA anchor key $K_{AKMA}$, the logic flow 900 may proceed to 914. If the AAnF 380 does not find the AKMA anchor key $K_{AKMA}$, it may sent an AKMA anchor key request to the AUSF 360 in Step 912. Such request my include $K_{ID}$. Upon receiving the request of Step 912, the AUSF 360 may identify the requested AKMA anchor key $K_{AKMA}$ according to $K_{ID}$, and respond to the AAnF 380 with the $K_{AKMA}$ and its validity time period in Step 913. In Step 914, The AAnF 380 may then store the anchor key $K_{AKMA}$ and its validity time period. The AAnF 380 may further identify a local validity time period for the anchor key $K_{AKMA}$ determined according to local key management strategies at the AAnF 380. The AAnF 380 may compare the local validity time period for the anchor key and the validity time period for the anchor key received from the AUSF 360 in Step 808 and use the smaller value as actual validity time period for the anchor key. If the validity time period for the anchor key is not included in the message sent from the AUSF 360 to the AAnF 380 in Step 808, the AAnF 380 may then use the local validity time period as actual validity time period for the anchor key. If no local validity time period for the anchor key is found in the AAnF 380, then the validity time period received from the AUSF 360 in Step 808 may be used as the actual validity time period for the anchor key. Further in Step 914, the AAnF 380 may generate the $K_{in\text{-}AF}$ based on $K_{in\text{-}AF}$=KDF($K_{AKMA}$, RAND, $AF_{ID}$). The exemplary key calculation KDF algorithm was described previously with respect to Step 909 of FIG. 9 and Step 806 in FIG. 8.

Continuing with FIG. 9, in Step 915, the AAnF 380 may generate a new random number denoted as NewRAND. The AAnF 380 may further generates a new identifier for the AKMA anchor key as $K_{ID\text{-}New}$=NewRAND @AAnF ID, or $K_{ID\text{-}New}$=Base64Encode (NewRAND)@AAnF ID. In Step 916, the AAnF 308 sends a response to the request for the initial $K_{in\text{-}AF}$ in Step 911. Such a response may include the initial application key $K_{in\text{-}AF}$, the NewRAND, $K_{ID\text{-}New}$, and/or the validity time period for $K_{ID\text{-}New}$. In some implementations, the validity time period for $K_{ID\text{-}New}$ may not be longer than the validity time period for the AKMA anchor key. If the Step 917 (see the description below) is performed prior to the Step 916, the response in Step 916 may further include the New $K_{AF}$ generated in Step 917 below.

In Step 917, the AAnF 380 generates a new application key $K_{AF\text{-}New}$ as $K_{AF\text{-}New}$=KDF ($K_{AKMA}$, NewRAND, $AF_{ID}$). The KDF algorithm is similar to the ones described above already. The Step 917 may be alternatively performed prior to Step 916. In Step 918, the AF 390 may record the pair of $K_{AF\text{-}New}$ and $K_{ID\text{-}New}$. AF 390 may further respond to the request of Step 910 and send the response message to the UE 310. Such response message may include the new random number NewRAND and/or the new AKMA anchor key identifier $K_{ID\text{-}New}$. The response message may further include validity time period for $K_{AF\text{-}New}$. In some implementations, the transmission of this response message may be encrypted using the $K_{in\text{-}AF}$ In other words, the various transmitted components of the response in Step 918 may be encrypted using $K_{in\text{-}AF}$. Afterwards, the AF 390 may remove the initial $K_{in\text{-}AF}$.

In Step 919, the UE 310 receives the response of Step 918. If the response is encrypted with $K_{in\text{-}AF}$, the UE 310 may decrypted the response using $K_{in\text{-}AF}$ it derives in Step 909. If the response includes NewRAND, the UE 310 may obtain the NewRAND component included in the response after decryption. The UE 310 may then generate the new identifier for the AKMA anchor ken $K_{ID\text{-}New}$ as $K_{in\text{-}AF}$=NewRAND@AAnF ID. If the encrypted $K_{ID\text{-}New}$ is already included in the response of Step 918, the UE 310 may decrypt the response to obtain the $K_{ID\text{-}New}$ directly.

In Step 920, the UE 310 may generate the new application key $K_{AF\text{-}New}$ as $K_{AF\text{-}New}$=KDF ($K_{AKMA}$, newRAND, AF ID), where KDF is a key generation algorithm described above with respect to Step 806 of FIG. 8. The UE 310 may store the new AKMA anchor key ID $K_{ID\text{-}New}$ and the new application key $K_{AF\text{-}New}$. If the validity time period for the new application key $K_{AF\text{-}New}$ was included in the response of Step 918, the UE 310 may also decrypt the response to obtain the validity time period for $K_{AF\text{-}New}$ and store it locally.

In Step 921, the UE 310 may initiate another communication request to the AF 390. The request message may include the new identifier for the AKMA anchor key $K_{ID\text{-}New}$, and the request message may be further encrypted by the UE 310 using the new application key $K_{AF\text{-}New}$. In Step 922, the AF 390 receives the communication request of Step 921, and may first determine whether the new application key $K_{AF\text{-}New}$ exist locally. If $K_{AF\text{-}New}$ exists locally, then the AF 290 may use such a $K_{AF\text{-}New}$ to decrypt the communication request from the UE 310 in Step 921. If the AF 390 cannot find the $K_{AF\text{-}New}$, it may then send a request message to the AAnF 380 for the new application key $K_{AF\text{-}New}$. The request message may include the new identifier for the AKMA anchor key $K_{ID\text{-}New}$, and $AF_{ID}$. In Step 923, the AAnF 380 receives the request message from Step 922, and query for the new application key $K_{AF\text{-}New}$ based on $K_{ID\text{-}New}$, and returns the $K_{AF\text{-}New}$ to the AF 390 in response. If Step 916 did not include any validity time period for $K_{AF\text{-}New}$, such validity time period may be included in the response message to AF 390 in Step 923. Finally in Step 924, the AF 390 may use the $K_{AF\text{-}New}$ to decrypt the communication request sent from the UE 310 in Step 921, and respond to the UE 310 for establishing communication with the UE 310. Such response may include validity time period for the new application key $K_{AF\text{-}New}$.

Figure 10:
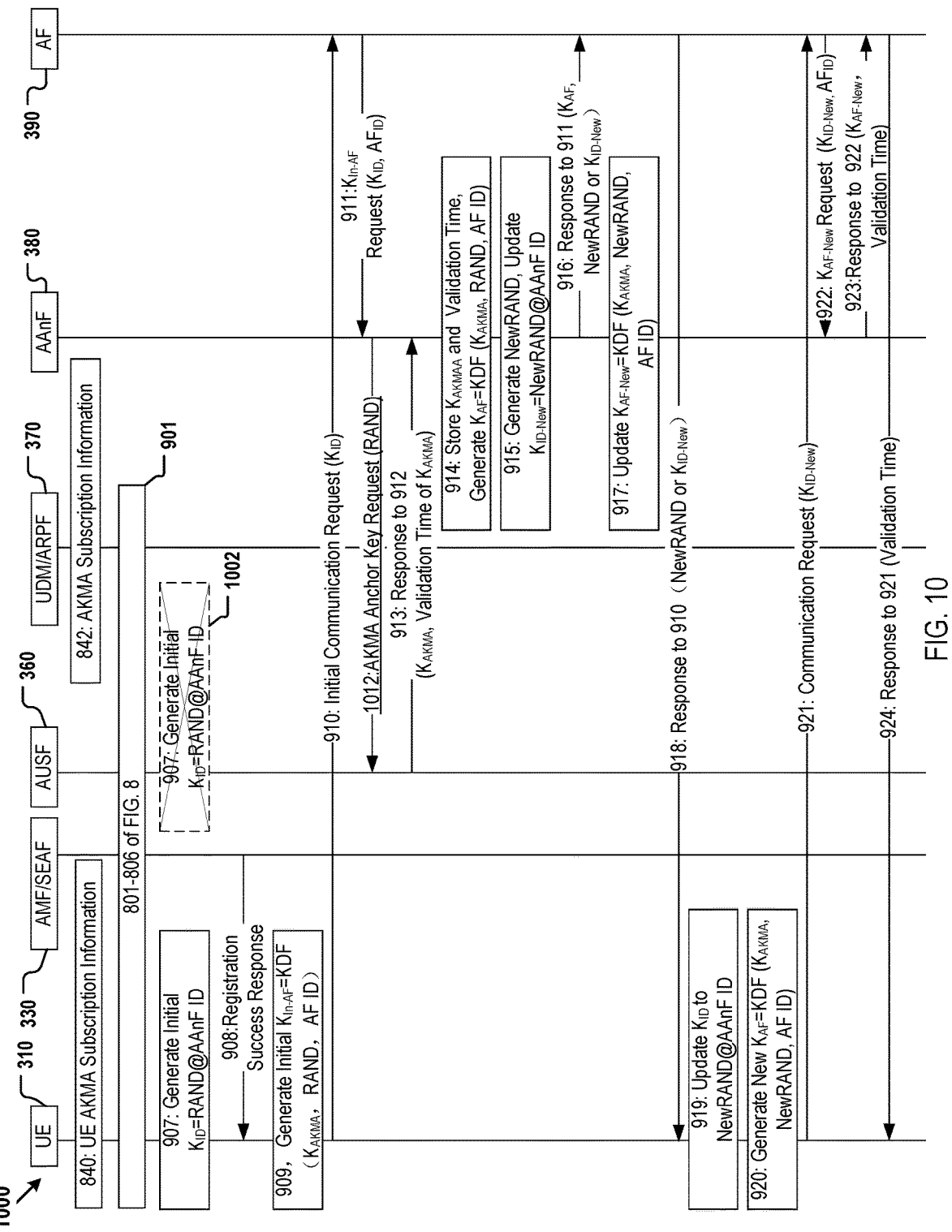
FIG. 10 shows another exemplary logic flow for subscription to an application key management service, user authentication, and generation of various levels of encryption keys for enabling encrypted communication between terminal devices and service applications in a wireless communication network.

FIG. 10 shows logic flow 1000 as an alternative implementation to FIG. 9. The logic flow 1000 is similar to the logic flow 900 of FIG. 9 (as shown by the identical labeling in FIGS. 9 and 10), except that step 907 of FIG. 9 is removed from FIG. 10 (as shown by 1002). As such, the AUSF 360 in FIG. 10 may not need to generate the initial identifier for the AKMA anchor key, $K_{ID}$. Accordingly, at Step 1012 in FIG. 10 (shown as an underlined step) replaces the Step 912 of FIG. 9. Specifically, because no initial $K_{ID}$ is generated at AUSF 360, the request from the AAnF 380 to the AUSF 360 for the AKMA anchor key information may be queried under RAND rather than $K_{ID}$. The AAnF 380 may derive the RAND parameter from the $K_{ID}$ it receives from AF 390 in Step 911 of FIG. 10.

Figure 11:
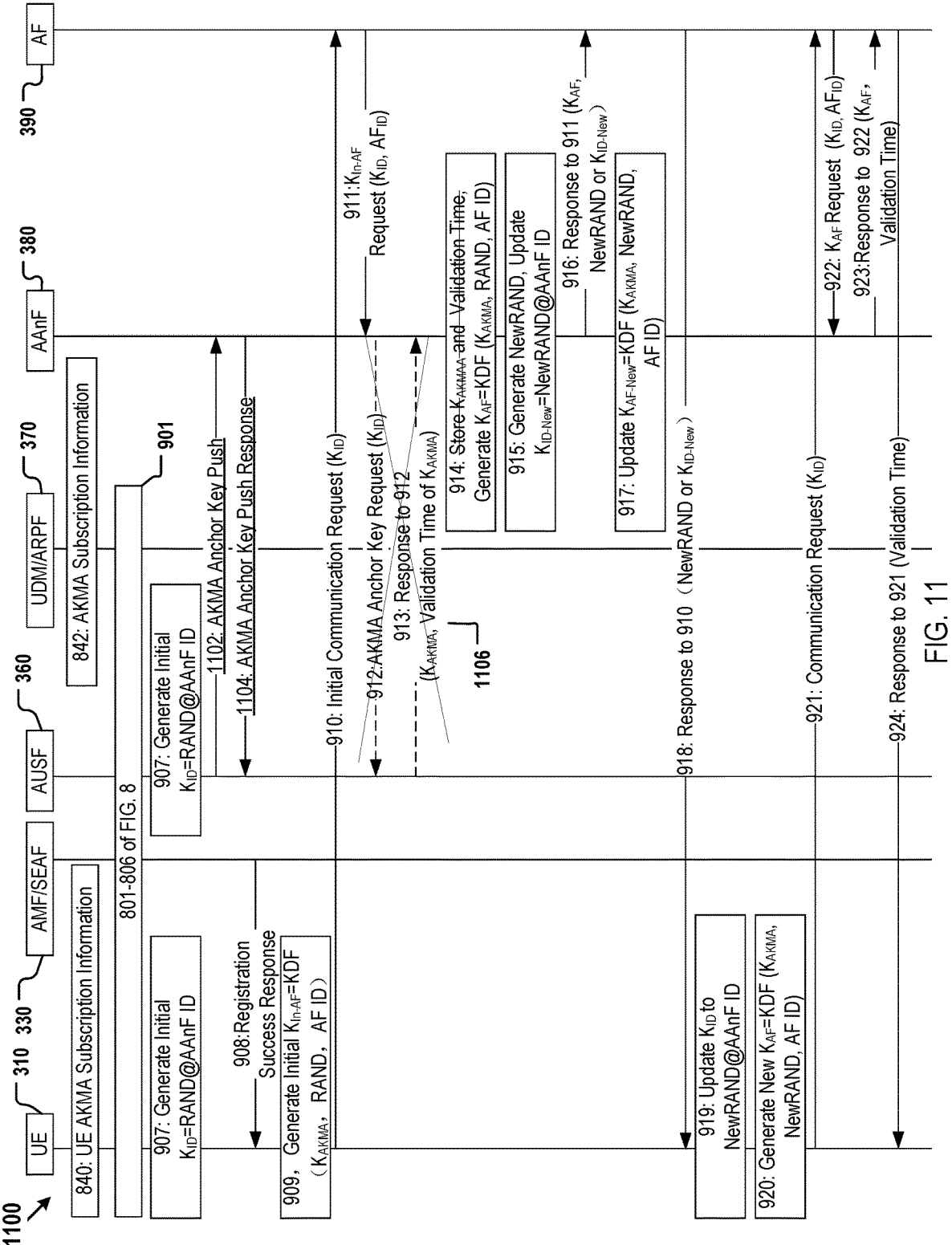
FIG. 11 shows another exemplary logic flow for subscription to an application key management service, user authentication, and generation of various levels of encryption keys for enabling encrypted communication between terminal devices and service applications in a wireless communication network.

FIG. 11 shows another logic flow 1100 alternative to the logic flows 900 and 1000 of FIGS. 9 and 10. The logic flow 1100 is similar to the logic flow 900 of FIG. 9 (as shown by the identical labeling in FIGS. 9 and 10) with differences from FIG. 9 annotated in FIG. 11. For example, Steps 1102 and 1104 (the underlined Steps in FIG. 11) are added in the logic flow 1100. In particular, in Step 1102, the AKMA anchor key is proactively pushed from AUSF 360 to the AAnF 380 once it is generated by the AUSF 360 rather than being passively requested by the AAnF 380 from the AUSF 360, as was implemented in Steps 912 and 913 of FIG. 9 (which are removed from the implementation of FIG. 11, as shown by 1106). In Step 1104, the AAnF 380 provides a response to the AUSF 360 if the AKMA anchor key is successfully received by the AAnF 380. Further, Step 914 of FIG. 11, compared with the same step in FIG. 10, may be modified as indicated in FIG. 11 for the reason that the AAnF 380 would already have the AKMA anchor key as a result of the proactive push from the AUSF 360 in Step 1102.

Figure 12:
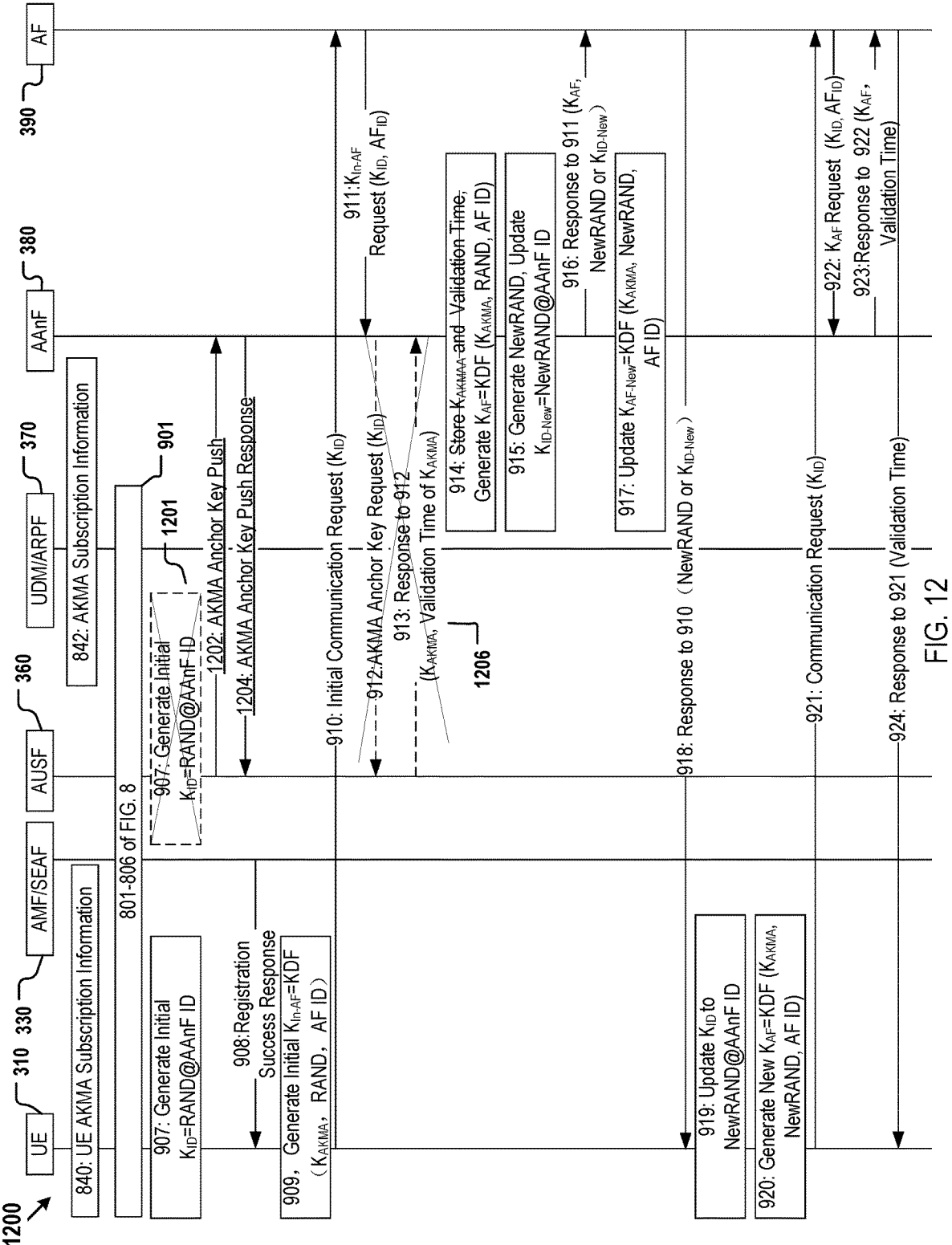
FIG. 12 shows yet another exemplary logic flow for subscription to an application key management service, user authentication, and generation of various levels of encryption keys for enabling encrypted communication between terminal devices and service applications in a wireless communication network.

FIG. 12 shows yet another logic flow 1200 alternative to the logic flows 900, 1000, and 1100 of FIGS. 9, 10, and 11. The logic flow 1200 follows the implementations of both the logic flow 1000 of FIG. 10 and logic flow 1100 of FIG. 11 in that the Steps 907, 912, and 913 of FIG. 9 are removed, as shown by 1201 and 1206, steps 914 is modified from FIG. 9, as indicated in FIG. 11, and the push steps 1202 and 1204 are added. As such, in the implementation of FIG. 12, the AKMA anchor key is proactively pushed from the AUSF 360 to the AAnF 380, just as the implementation in FIG. 11. Further, there is no need to generate any initial $K_{ID}$ at the AUSF 360 because no request needs to be directed later to the AUSF 360 for querying the AKMA anchor key as a result of the information push in Step 1202 and 1204.

In the implementations illustrated in FIGS. 9-12, a new random number is generated by the AAnF 380 and used for generation of a new application key and new identifier for the AKMA anchor key. The original RAND generated as part of the authentication vector by the UDM/ARPF 370 may only be transmitted between the various network functions in a limited manner and thus may be less exposed to security breaches. The new random number may be generated for each communication between the UE 310 and AF 390 and thus security breach of one new random number may not pose a risk for a separate communication session. The communication security is thus improved in the implementations of FIGS. 9-12.

Figure 13:
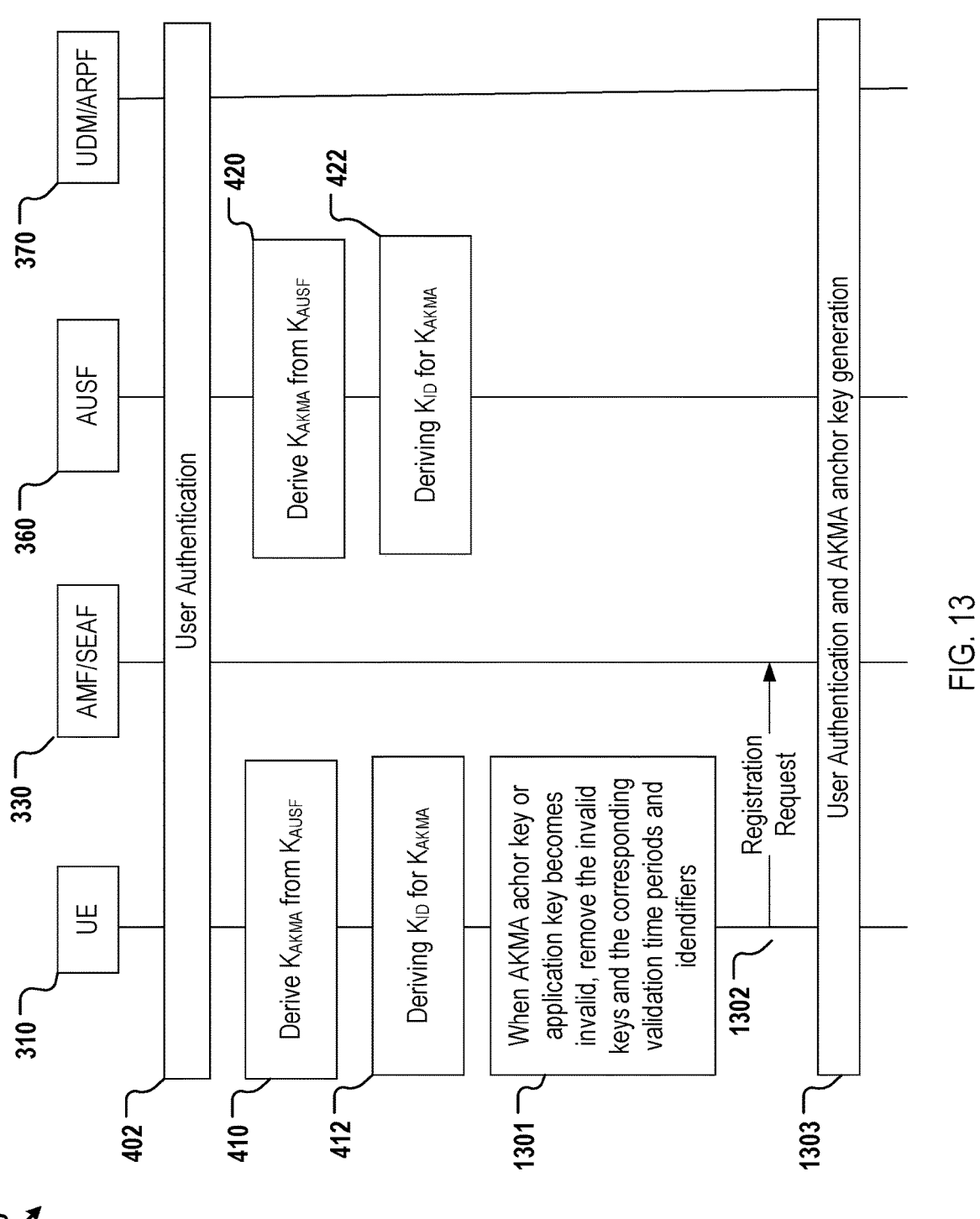
FIG. 13 shows an exemplary logic flow for updating invalid application anchor keys or application keys in a wireless communication network.
Figure 14:
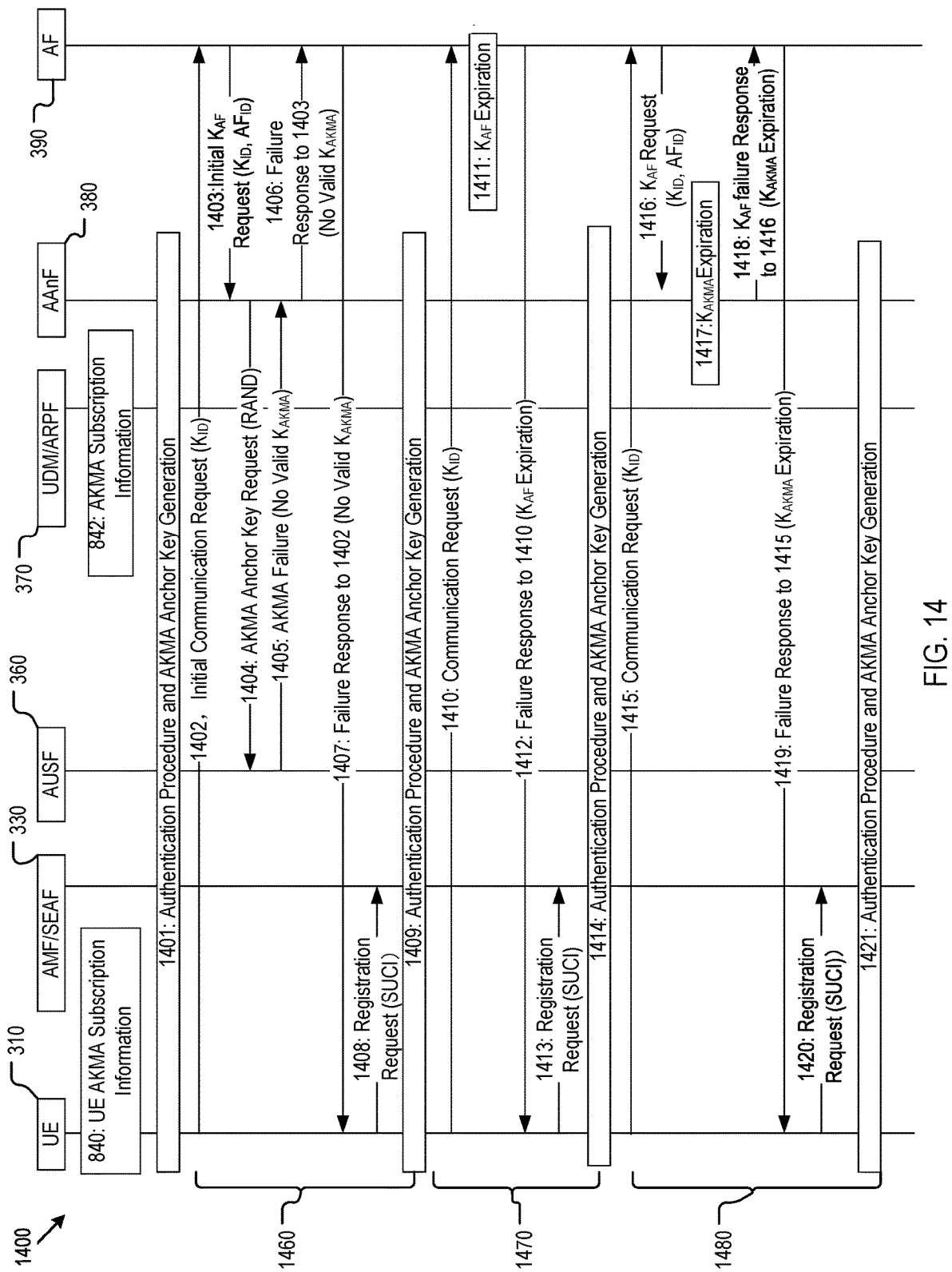
FIG. 14 shows an exemplary logic flow for re-authentication/registration in various scenarios in which the encryption keys at various levels become invalid.

As described above, in order to further improve communication security, the various keys involved in encrypted communication between the UE 310 and a service application may be associated with validity time periods (or expiration time). In other words, these keys are only valid within such validity time periods. In particular, when these keys becomes invalid, the communication between the UE 310 and the service applications may not be protected by encryption. As such, these keys may need to be updated when they becomes invalid. FIGS. 13-14 described below show various implementations for updating the various keys (including e.g., the AKMA anchor key and the application key) when they are invalid or become invalid.

FIG. 13 illustrates an UE-initiated implementation 1300 for updating invalid keys. The user authentication procedure 402 and steps 410, 412, 420, 422 are identical to corresponding steps described with respect to FIG. 4. The description of FIG. 4 above applies to these steps in FIG. 13. Following these steps, the AKMA anchor key may be generated. In Step 1301, the UE 310 determines that the AKMA anchor key or the AKMA application key is or becomes invalid. The UE 310 then deletes the invalid AKMA anchor key or application key, the corresponding validity time periods, and the identifier for the invalid AKMA anchor key.

In Step 1302, when the UE is in an idle state, the UE may initiate a registration request message to the wireless network (to network functions such as AMF/SEAF 330 or AUSF 360). Such registration request message may include the SUCI, or 5G-GUTI and an ngKSI (security context index) of, for example, 7, indicating that the UE security context is invalid. When the UE 310 is in an active state handling non-emergency services or a non-high-priority services, and the UE 310 enters into an idle state, the UE may initiate the registration request to the network. When the UE 310 is in an active state handling emergency services or high priority services, the UE may wait until completion of the emergent or high-priority services and then enter into the idle state and initiate the request to registration to the network. In some other implementations, when the UE is in an active state, the UE may wait for completion of the active services and then initiate the registration request to the network regardless of the emergency or priority of the active services.

In Step 1303, the UE may go through main authentication and registration with the network and then generate new AKMA anchor key and/or application key, and determine validity time periods and identifiers for these new keys. The UE and the network both record these keys, validity time periods and identifiers.

FIG. 14 shows a network-initiated update of invalid AKMA keys. In FIG. 14, the UE may have subscribed to the AKMA service. In 840 of FIG. 14, the AKMA service subscription information corresponding to the UE may be recorded in the UE. Such subscription information may include one or more combinations of: an indicator for whether the UE has subscribed to the AKMA service; one or more AAnF identifiers; one or more AF identifiers; and AKMA anchor key validity time period. In 842 of FIG. 14, the corresponding user subscription information recorded in the UDM/ARPF 370 may include one or more of: an indicator for whether the UE has subscribe to the AKMA service; one or more AAnF identifiers; and the AKMA anchor key validity time period. During the UE registration and authentication procedure, the UDM/ARPF 370 may transmit the AKMA service subscription information to the AUSF 360.

In Step 1401 of FIG. 14, the UE and the network complete main authentication procedure and generate AKMA anchor key $K_{AKMA}$ and the corresponding identifier $K_{ID}$, the AKMA application key $K_{AF}$, and validity time periods for these keys. These keys may be invalid for various reasons. In FIG. 14, logic flow 1460, 1470, and 1480 illustrate key updates under various exemplary scenarios in which at least one of these keys becomes invalid.

For the exemplary logic flow 1460, the AKMA anchor key may be invalid. In Step 1402, the UE 310 may initiate a communication request to the AF 390. The communication request may include the identifier for the AKMA anchor key, $K_{ID}$. In Step 1403, the AF 390 may send an initial application key request message including $K_{ID}$ and AFD to the AAnF 380 according to the AAnF identifier in the $K_{ID}$. In Step 1404, the AAnF 380 may query for the AKMA anchor key $K_{AKMA}$ according to $K_{ID}$. If the AAnF 380 does not find the AKMA anchor key $K_{AKMA}$, it may send an AKMA anchor key request message to the AUSF 360. The request message may include $K_{ID}$. In Step 1405, the AUSF 360 may query for a valid AKMA anchor key according to $K_{ID}$ and may not be able to find a valid AKMA anchor key. The AUSF 360 may then respond with a failure message to the AAnF 380 indicating that no valid AKMA anchor key was found. In Step 1406, the AAnF 380 respond to AF 390 with a failure message indicating that no valid AKMA anchor key was found. In Step 1407, the AF 390 may respond with a failure message to the UE 310 indicating that no valid AKMA anchor key was found. In Step 1408, the UE 310 initiates another registration request to the network. Such registration request message may include the SUCI of the UE, or 5G-GUTI of the UE and an ngKSI (security context index) of, for example, 7, indicating that the UE security context is invalid. In Step 1409, after the UE 310 and the network complete the another main authentication and registration, a new AKMA anchor key and/or AKMA application key, their identifiers, and/or their validity time periods may be generated. The UE 310 and the network may save these keys, validity time periods, and identifiers.

For the exemplary logic flow 1470, the application key may have expired. In Step 1410, the UE 310 may initiate a communication request to the AF 390. The communication request may include the identifier for the AKMA anchor key, $K_{ID}$. In Step 1411, the AF 390 may determine that the application key has expired. In Step 1412, the AF 390 may respond with a failure message to the UE 310 indicating that the application key has expired. In Step 1413, the UE 310 initiates another registration request to the network. Such registration request message may include the SUCI of the UE, or 5G-GUTI of the UE and an ngKSI (security context index) of, for example, 7, indicating that the UE security context is invalid. In Step 1414, after the UE 310 and the network complete another main authentication and registration, a new AKMA anchor key and/or AKMA application key, their identifiers, and/or their validity time periods may be generated. The UE 310 and the network may save these keys, validity time periods, and identifiers.

For the exemplary logic flow 1480, the AKMA anchor key may have expired. In Step 1415, the UE 310 may initiate a communication request to the AF 390. The communication request may include the identifier for the AKMA anchor key, $K_{ID}$. In Step 1416, the AF 390 may send an application key request message including $K_{ID}$ and $AF_{ID}$ to the AAnF 380 according to the AAnF identifier in the $K_{ID}$. In Step 1417, the AAnF 380 may determine that the AKMA anchor key $K_{AKMA}$ has expired. In Step 1418, the AAnF 380 respond to AF 390 with a failure message indicating that the AKMA anchor key has expired. In Step 1419, the AF 390 may respond with a failure message to the UE 310 indicating that the AKMA anchor key has expired. In Step 1420, the UE 310 initiates another registration request to the network. Such registration request message may include the SUCI of the UE, or 5G-GUTI of the UE and an ngKSI (security context index) of, for example, 7, indicating that the UE security context is invalid. In Step 1421, after the UE 310 and the network complete another main authentication and registration, a new AKMA anchor key and/or AKMA application key, their identifiers, and/or their validity time periods may be generated. The UE 310 and the network may save these keys, validity time periods, and identifiers.

The implementations above described for FIGS. 1-14 thus provide an architecture for a communication network to offer an application key service that can be subscribed to by terminal devices. These implementations further provide various schemes for generation, management, and update of various hierarchical levels of keys for enabling encrypted communication between the terminal devices and service applications via the communication network. The disclosed implementations facilitate flexibility in communication with the service applications, and reduce risk to security breaches.

The accompanying drawings and description above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for key regeneration in a terminal device for encrypted communication between the terminal device and a service application in a communication network, comprising:
in response to determining that the terminal device is subscribed to the encrypted communication with the service application as a subscribable security service:
detecting that a first key for enabling encrypted communication with the service application previously generated from a first authentication of the terminal device with the communication network has become invalid;
transmitting a request for a second authentication to the communication network;

generating a second key for enabling encrypted communication with the service application when the second authentication is successful;
replacing the first key with the second key; and
exchanging data with the service application based on the second key;
and in response to determining that the terminal device is not subscribed to the subscribable security service with respect to another service application, exchanging data with the another service application without encryption,
wherein the first key and the second key comprise, respectively, a first anchor key and a second anchor key, generated during the first authentication and the second authentication of the terminal device with the communication network, respectively; and
wherein encrypted communications with service applications are subscribable by the terminal device on a service application by service application basis as managed by the communication network and the service applications supporting the encrypted communications are registered with the communication network.

2. The method of claim 1, wherein:
each of the first anchor key and second anchor key is configured to be managed by an application key service; and
each of the first anchor key and second anchor key is configured to function as a basis for a generation of an application key for encrypted communication between the terminal device and the service application.

3. The method of claim 2, wherein each of the first anchor key and the second anchor key is associated with a key expiration time period and a key identifier.

4. The method of claim 1, wherein the first key and the second key comprise a first application key and a second application key for encrypted communication between the terminal device and the service application.

5. The method of claim 4, wherein:
each of the first application key and the second application key are respectively generated from the first anchor key and the second anchor key when the first authentication and the second authentication are successful; and
wherein the first application key, the second application key, the first anchor key and the second anchor key are managed by an application key service offered by the communication network to the terminal device for subscription.

6. The method of claim 5, wherein at least one of the first anchor key, the second anchor key, the first application key, and the second application key is associated with a key expiration time period and a key identifier.

7. The method of claim 1, wherein detecting that the first key has become invalid comprises determining that the first key has expired according to a predetermined expiration time period.

8. The method of claim 1, wherein detecting that the first key has become invalid comprises determining that the first key cannot be identified.

9. The method of claim 1, wherein detecting that the first key has become invalid comprises:
transmitting a communication request to the service application comprising an identifier corresponding to the first key; and
receiving a response from the service application indicating the first key has become invalid; and determining that the first key has become invalid based on the response from the service application.

10. The method of claim 1, wherein the request for the second authentication comprises a subscription concealed identifier (SUCI) for identifying the terminal device or a global unique temporary identifier (GUTI) with key set identifier indicating that a security context for the terminal device is invalid.

11. The method of claim 1, wherein transmitting the request for the second authentication is initiated when the terminal device is idle.

12. The method of claim 1, wherein the terminal device is in an active communication session and wherein transmitting the request for the second authentication is initiated by switching the terminal device into an idle state prior to completion of the active communication session or initiated after the terminal device completes the active communication session and switches to an idle state.

13. The method of claim 1, wherein the terminal device is in an active communication session and wherein transmitting the request for the second authentication is initiated after the terminal device completes the active communication session and switches to an idle state when the active communication session is emergency and high-priority, and is initiated without completion of the active communication session if the active communication session is not emergency and low-priority.

14. The method of claim 1, wherein the terminal device is in an active communication session and wherein transmitting the request for the second authentication is initiated after the terminal device completes the active communication session and switches to an idle state.

15. A method for key regeneration for encrypted communication between a terminal device and a service application in a communication network, the method performed by an application key management network node and comprising:

in response to determining that the terminal device is subscribed to the encrypted communication with the service application as a subscribable security service:

receiving a first request for an anchor key from the service application after the service application receives a communication request from the terminal device;

determining that the anchor key being requested is invalid; and transmitting to the service application a response to the first request for the anchor key indicating that the anchor key being requested is invalid, causing the service application to transmit a second response to the terminal device indicating that the anchor key being requested is invalid and causing the terminal device to initiate a request for an authentication procedure with the communication network to obtain a replacement to the anchor key; and in response to determining that the terminal device is not subscribed to the subscribable security service with respect to another service application, enabling data exchange between the terminal device and the another service application without encryption; and wherein encrypted communications with the service applications are subscribable by the terminal device on a service application by service application basis as managed by the communication network and the service applications supporting the encrypted communications are registered with the communication network.

16. The method of claim 15, wherein the first request for the anchor key comprises a first identifier for the anchor key.

17. The method of claim 16, wherein determining that the anchor key being requested is invalid comprises:

determining that the anchor key corresponding to the first identifier is non-existent in the application key management network node;

transmitting a second request for the anchor key to an authentication network node wherein the second request comprises the first identifier;

receiving from the authentication network node a response indicating to the second request that the anchor key corresponding to the first identifier is invalid; and determining that the anchor key being requested is invalid based on the response from the authentication network node.

18. The method of claim 15, wherein the anchor key being requested is associated with an expiration time period and the requested anchor key has become invalid due to an end of the expiration time period.

19. The method of claim 15, wherein the request for the authentication procedure comprises a subscription concealed identifier (SUCI) for identifying the terminal device or a global unique temporary identifier (GUTI) with key set identifier indicating that a security context for the terminal device is invalid.

20. A terminal device comprising one or more processors and one or more memories, wherein the one or more processors are configured to read computer code from the one or more memories to:

in response to determining that the terminal device is subscribed to an encrypted communication as a subscribable security service with a service application:

detect that a first key for enabling encrypted communication with the service application previously generated from a first authentication of the terminal device with a communication network has become invalid;

transmit a request for a second authentication to the communication network;

generate a second key for enabling encrypted communication with the service application when the second authentication is successful;

replace the first key with the second key; and exchange data with the service application based on the second key; and in response to determining that the terminal device is not subscribed to the subscribable security service with respect to another service application, exchanging data with the another service application without encryption, wherein the first key and the second key comprise, respectively, a first anchor key and a second anchor key, generated during the first authentication and the second authentication of the terminal device with the communication network, respectively; and wherein encrypted communications with the service applications are subscribable by the terminal device on a service application by service application basis as managed by the communication network and the service applications supporting the encrypted communications are registered with the communication network.

\* \* \* \* \*